(12) United States Patent
Zhu et al.

(10) Patent No.: US 10,566,908 B2
(45) Date of Patent: *Feb. 18, 2020

(54) POWER CONVERTER WITH WIDE DC VOLTAGE RANGE

(71) Applicant: Futurewei Technologies, Inc., Plano, TX (US)

(72) Inventors: Huibin Zhu, Plano, TX (US); Xiaolin Mao, Plano, TX (US); Heping Dai, Plano, TX (US); Dianbo Fu, Frisco, TX (US)

(73) Assignee: FUTUREWEI TECHNOLOGIES, INC., Plano, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/277,080

(22) Filed: Feb. 15, 2019

(65) Prior Publication Data

US 2019/0252988 A1  Aug. 15, 2019

Related U.S. Application Data

(63) Continuation of application No. 16/007,750, filed on Jun. 13, 2018, now Pat. No. 10,224,827.
(Continued)

(51) Int. Cl.
*H02M 3/335* (2006.01)
*H02M 1/088* (2006.01)

(52) U.S. Cl.
CPC ....... *H02M 3/33576* (2013.01); *H02M 1/088* (2013.01)

(58) Field of Classification Search
CPC .. H02M 3/315; H02M 3/325; H02M 3/33569; H02M 3/33576; H02M 3/33584;
(Continued)

(56) References Cited

U.S. PATENT DOCUMENTS 4,618,919 A * 10/1986 Martin, Jr. ........ H02M 3/33569
363/16
9,819,272 B2 * 11/2017 Perreault ................. H02M 3/07
(Continued)

FOREIGN PATENT DOCUMENTS

WO     2017206011 A1    12/2017

OTHER PUBLICATIONS

International Search Report dated Mar. 21, 2019, in PCT Application No. PCT/CN2019/075155, 9 pages.

*Primary Examiner* — Adolf D Berhane
(74) *Attorney, Agent, or Firm* — Vierra Magen Marcus LLP

(57) ABSTRACT

According to one aspect of the present disclosure, there is provided an apparatus that includes a first power converter stage connected to a first side of a first transformer, and a second power converter stage connected to a first side of a second transformer. The apparatus further includes an interleaved multi-bridge circuit connected to the second side of the first transformer and to the second side of the second transformer. The apparatus further includes a controller that is configured to operate the interleaved multi-bridge circuit in a parallel mode in which the second sides of the first and second transformers are in parallel at a DC terminal of the interleaved multi-bridge circuit and in a series mode in which the second sides of the first and second transformers are in series at the DC terminal.

20 Claims, 20 Drawing Sheets

Related U.S. Application Data

(60) Provisional application No. 62/631,226, filed on Feb. 15, 2018.

(58) Field of Classification Search
CPC ......... H02M 3/33592; H02M 3/33507; H02M 1/08; H02M 1/083; H02M 1/088; H02M 2007/4815
See application file for complete search history.

(56) References Cited

U.S. PATENT DOCUMENTS

| | | | |
|---|---|---|---|
| 10,224,827 B1* | 3/2019 | Zhu .................. | H02M 1/088 |
| 2012/0092905 A1* | 4/2012 | Srighakollapu ... | H02M 3/33523 |
| | | | 363/37 |
| 2012/0313430 A1* | 12/2012 | Wu .................. | H02M 3/3376 |
| | | | 307/9.1 |
| 2013/0083563 A1* | 4/2013 | Wang .................. | H02M 3/285 |
| | | | 363/17 |
| 2013/0250623 A1* | 9/2013 | Xu .................. | H02M 3/285 |
| | | | 363/17 |
| 2014/0049990 A1* | 2/2014 | Limpaecher .......... | H02M 3/24 |
| | | | 363/15 |
| 2014/0307481 A1* | 10/2014 | Wang .................. | H02M 3/285 |
| | | | 363/17 |
| 2015/0207335 A1* | 7/2015 | Madawala ............ | H02J 7/025 |
| | | | 307/104 |
| 2015/0256098 A1 | 9/2015 | Buthker | |

* cited by examiner

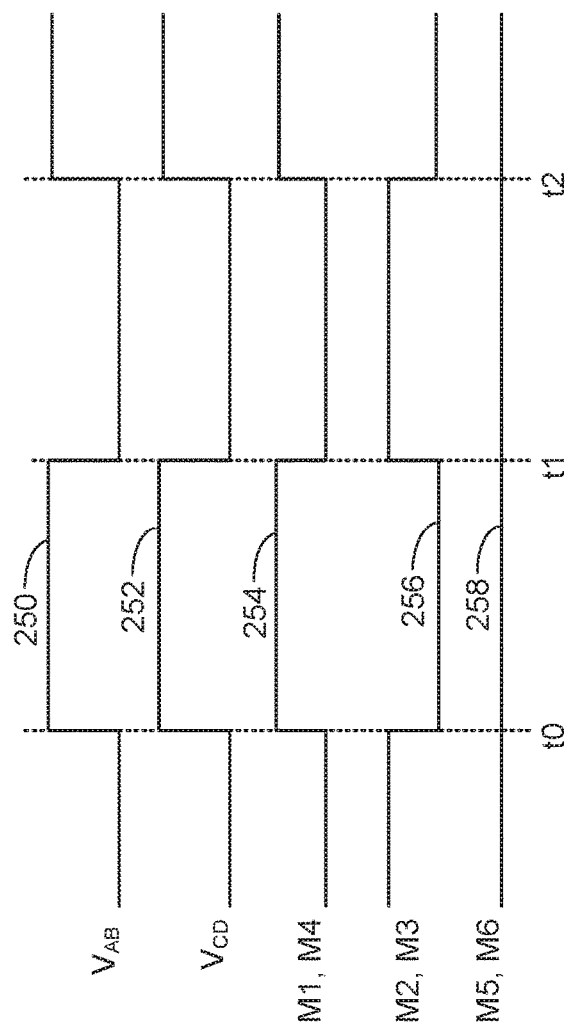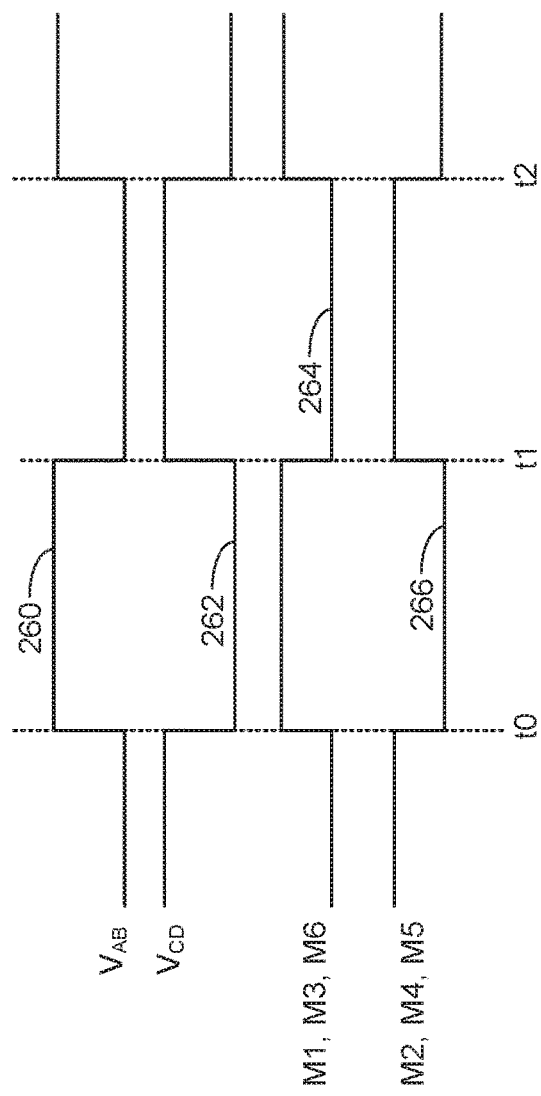

POWER CONVERTER WITH WIDE DC VOLTAGE RANGE

CLAIM FOR PRIORITY

The present application claims the benefit of priority to U.S. application Ser. No. 16/007,750, filed Jun. 13, 2018, incorporated by reference herein in its entirety, which claims the benefit of priority to U.S. Provisional Appl. No. 62/631,226, filed Feb. 15, 2018, incorporated by reference herein in its entirety.

FIELD

The disclosure generally relates to the field of electric power converters.

BACKGROUND

Electric power converters include AC to DC power converters, as well as DC to DC power converters. Electric power converters have a wide range of uses including, but not limited to, charging batteries and providing power to electronic devices.

Electric power converters are potentially dangerous due to high voltages and currents. A transformer may be used to provide electrical isolation between two electrical circuits. For example, an electric power converter may contain a transformer to provide electrical isolation between an input terminal and an output terminal.

BRIEF SUMMARY

According to one aspect of the present disclosure, there is provided an apparatus comprising a first power converter stage configured to transfer power between its first port and second port; a second power converter stage configured to transfer power between its first port and second port; an interleaved multi-bridge circuit connected to a first transformer and a second transformer, wherein the interleaved multi-bridge circuit comprises three or more bridges and has a direct current (DC) terminal; and a controller coupled to the interleaved multi-bridge circuit, the first power converter stage, and the second power converter stage, wherein the controller is configured to operate the interleaved multi-bridge circuit in a parallel mode in which a side of the first and second transformers are in parallel at the DC terminal resulting in a first voltage at the DC terminal being equal to both a second voltage on the side of the first transformer and a third voltage on the side of the second transformer.

Optionally, in the preceding aspect, the controller is further configured to operate the first power converter stage and the second power converter stage in a full bridge mode.

Optionally, in the preceding aspect, the controller is further configured to operate the first power converter stage and the second power converter stage in a half bridge mode.

Optionally, in the preceding aspect, the first power converter stage is a first dual active bridge (DAB) and the second power converter stage is a second dual active bridge (DAB), wherein the controller is further configured to operate the first and second DABs in a symmetrical phase-shift gating control mode or a double phase-shift control mode.

Optionally, in the preceding aspect, the first power converter stage is a first resonant converter and the second power converter stage is a second resonant converter, wherein the controller is further configured to operate the first and second resonant converters in a symmetrical frequency modulation gating control mode.

Optionally, in the preceding aspect, the controller is further configured to operate the first and second power converter stages in a pulse skipping mode.

Optionally, in the preceding aspect, the apparatus further comprises one or more AC to DC rectifiers connected to an input of the first power converter stage and to the input of the second power converter stage.

Optionally, in the preceding aspect, the first transformer has a first side and a second side; the second transformer has a first side and a second side; the first power converter stage has a first port connected to the first side of the first transformer and has a second port; the second power converter stage has a first port connected to the first side of the first transformer and has a second port; the interleaved multi-bridge circuit connected to the second side of the first transformer and to the second side of the second transformer; and the controller is further configured to operate in a series mode in which the second sides of the first and second transformers are in series at the DC terminal resulting in a fourth voltage at the DC terminal being a summation of a fifth voltage on the second side of the first transformer and a sixth voltage on the second side of the second transformer.

According to one other aspect of the present disclosure, there is provided a method of operating a power converter, the method comprising controlling a first high frequency converter to transfer power between a first port and a second port; controlling a second high frequency converter to transfer power between a first port and a second port; and controlling an interleaved multi-bridge circuit connected to a side of a first transformer and a side of a second transformer in a series mode in which the sides of the first and second transformers are in series at the DC terminal of the interleaved multi-bridge circuit resulting in a first voltage at the DC terminal being a summation of a second voltage on the second side of the first transformer and a third voltage on the second side of the second transformer, wherein the interleaved multi-bridge circuit comprises three or more bridges.

Optionally, in any of the preceding aspects, the method further comprises operating the first high frequency converter and the second high frequency converter in a full bridge mode while operating the interleaved multi-bridge circuit in the series mode or in a parallel mode.

Optionally, in any of the preceding aspects, the method further comprises operating the first high frequency converter and the second high frequency converter in a half bridge mode while operating the interleaved multi-bridge circuit in a parallel mode or in the series mode.

Optionally, in any of the preceding aspects, the first high frequency converter is a first dual active bridge (DAB) and the second high frequency converter is a second dual active bridge (DAB), and further comprising operating the first and second DABs in either a double phase shift control mode or a symmetrical phase-shift gating control mode.

Optionally, in any of the preceding aspects, the first high frequency converter is a first resonant converter and the second high frequency converter is a second resonant converter, further comprising operating the first and second resonant converters in a symmetrical frequency modulation driving mode.

Optionally, in any of the preceding aspects, the method further comprises operating the first and second high frequency converters in a pulse skipping mode in response to light load conditions.

Optionally, in any of the preceding aspects, the first high frequency converter has a first port connected to a first side of the first transformer and has a second port; the second high frequency converter has a first port connected to a first side of the first transformer and has a second port; the method further comprises controlling the interleaved multi-bridge to operate in a parallel mode in which the second sides of the first and second transformers are in parallel at a DC terminal of the interleaved multi-bridge circuit resulting in a fourth voltage at the DC terminal being equal to both a fifth voltage on the second side of the first transformer and a sixth voltage on the second side of the second transformer.

According to still one other aspect of the present disclosure, there is provided an alternating current (AC) to direct current (DC) converter, comprising one or more AC to DC rectifiers each having an input and an output, wherein the one or more AC to DC rectifiers are each configured to provide a DC voltage to their respective output in response to an AC voltage at their respective input; a first high frequency converter having an input connected to the output of one of the one or more AC to DC rectifiers, the first high frequency converter having an output connected to a first side of a first transformer, wherein the first high frequency converter is configured to provide a first output voltage to the first side of the first transformer in response to a first DC voltage from one of the one or more AC to DC rectifiers; a second high frequency converter having an input connected to the output of one of the one or more AC to DC rectifiers, the second high frequency converter having an output connected to a first side of a second transformer, wherein the second high frequency converter is configured to provide a second output voltage to the first side of the second transformer in response to a second DC voltage from one of the one or more AC to DC rectifiers; an interleaved multi-bridge circuit connected to a second side of the first transformer and to a second side of the second transformer, wherein the interleaved multi-bridge circuit comprises three or more bridges and has a direct current (DC) output; and a controller coupled to the interleaved multi-bridge circuit, to the first high frequency converter, and to the second high frequency converter, wherein the controller is configured to operate the interleaved multi-bridge circuit in a parallel mode in which the second sides of the first and second transformers are in parallel at the DC output resulting in a first voltage at the DC output being equal to both a second voltage on the second side of the first transformer and a third voltage on the second side of the second transformer.

Optionally, in any of the preceding aspects, the controller is further configured to operate the first high frequency converter and the second high frequency converter in a full bridge mode when controller operates the interleaved multi-bridge circuit in the series mode.

Optionally, in any of the preceding aspects, the controller is further configured to operate the first high frequency converter and the second high frequency converter in a half bridge mode when controller operates the interleaved multi-bridge circuit in the parallel mode.

Optionally, in any of the preceding aspects, the first high frequency converter is a first dual active bridge (DAB) and the second high frequency converter is a second dual active bridge (DAB), wherein the controller is further configured to operate the first and second DABs in a symmetrical phase-shift gating control mode or a double phase-shift control mode.

Optionally, in any of the preceding aspects, the first high frequency converter is a first Inductor-Inductor-Capacitor (LLC) resonant converter and the second high frequency converter is a second LLC resonant converter, wherein the controller is further configured to operate the first and second LLC resonant converters in a symmetrical frequency modulation gating control mode.

Optionally, in any of the preceding aspects, the controller is further configured to operate the first and second high frequency converters in a pulse skipping mode in response to light load conditions.

Optionally, in any of the preceding aspects, the first high frequency converter and the second high frequency converter each input the same DC voltage from the same AC to DC rectifier.

Optionally, in any of the preceding aspects, the AC to DC converter further comprises a first transformer having the first side and the second side; and a second transformer having the first side and the second side, wherein the controller is configured to operate in a series mode in which the second sides of the first and second transformers are in series at the DC output resulting in a fourth voltage at the DC output being a summation of a fifth voltage on the second side of the first transformer and a sixth voltage on the second side of the second transformer.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

FIG. 2C depicts voltage waveforms during operation of one embodiment of a series configuration of the interleaved multi-bridge circuit of FIG. 2A.

FIG. 2D depicts voltage waveforms during operation of one embodiment of a parallel configuration of the interleaved multi-bridge circuit of FIG. 2A.

DETAILED DESCRIPTION

Figure 1:
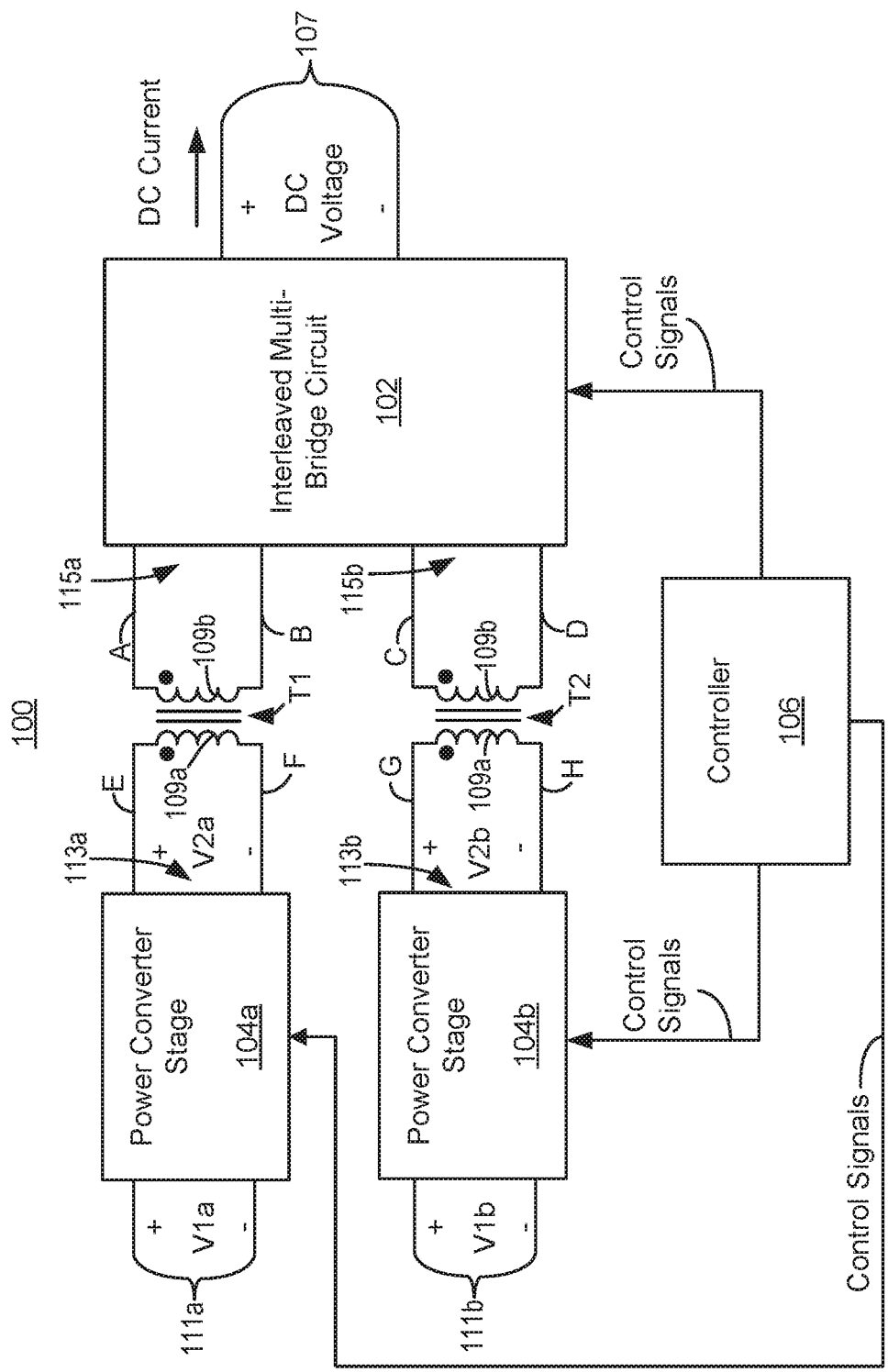
FIG. 1 is a diagram of one embodiment of an electric power converter.

The present disclosure will now be described with reference to the figures, which in general relate to a power converter having a wide range in DC voltage at a DC terminal of the power converter, as well as methods of operating the power converter. The power converter is capable of bi-directional power flow, in some embodiments. Embodiments of the power converter are able to maintain high efficiency while providing a wide range in DC output voltage. Embodiments of the power converter are able to maintain high efficiency while having a wide range in DC input voltage. Additionally, embodiments of the power converter have a high power rating. For example, one embodiment of a power converter has a power rating of over 100 kW. In one embodiment, the power converter is a DC to DC converter. In one embodiment, the power converter is an AC to DC converter. One embodiment includes an AC to DC converter that may be used to charge electric vehicles. The DC voltage needed to charge different electric vehicles can have a wide range (e.g., 200 V to 800 V). The DC output of one embodiment of an AC to DC converter has a 1:4 range (e.g., 200 V to 800 V). Thus, one embodiment of an AC to DC converter can be used to charge a variety of types of electric vehicles. This provides for an economical solution for electric vehicle charging stations.

It can be very challenging to design power converters having such a wide DC voltage range, while maintaining high efficiency. One embodiment of a power converter has a pair of transformers, each having a first side and a second side. The first side may be the primary side or the secondary side, depending on the direction of power flow. The second side may be the secondary side or the primary side, depending on the direction of power flow. The power converter has a pair of power converter stages, with each power converter stage having a first port connected to the first side of one of the transformers. Each power converter stage has a second port, which might receive a DC input voltage or provide a DC output voltage, depending on the direction of power flow. The power converter stages are configured to transfer power between their respective first and second ports (in either direction). In some embodiments, the power converter stages are high switching frequency power converters (also referred to as high frequency converters). As defined herein, a high frequency converter (or high switching frequency power converter) has a switching frequency of at least 10 KHz. In one embodiment, the power converter stages are resonant converters. For example, the power converter stages may be Inductor-Inductor-Capacitor (LLC) converters. In one embodiment, each power converter stage is dual active bridge (DAB). In some embodiments, soft switching is used to control the power converter stages, which may increase power efficiency by reducing switching losses. Switching losses are due to power dissipation that occurs when a transistor or diode switches between a conducting state and a non-conducting state. The power converter has an interleaved multi-bridge circuit connected to the second sides of the pair of transformers. The interleaved multi-bridge circuit has a DC terminal, which provides a wide range in DC output voltage when power flow is from the power converter stages to the interleaved multi-bridge circuit. The DC terminal of the interleaved multi-bridge circuit allows for a wide range in DC input voltage when power flow is from the interleaved multi-bridge circuit to the power converter stages.

One embodiment of a power converters has a controller that operates the interleaved multi-bridge circuit in a parallel mode in which the second sides of the transformers are in parallel at the DC terminal of the interleaved multi-bridge circuit and in a series mode in which the second sides of the transformers are in series at the DC output. Note that the series mode may place the voltages from the first port of the two power converter stages in series, whereas the parallel mode may place the voltage from the first port of the two power converter stages in parallel. The series mode has double the voltage as the parallel mode (for the same voltages from the power converter stages), in one embodiment. The parallel mode has double the current as the series mode (for the same currents from the power converter stages), in one embodiment.

One embodiment of a power converter is able to control the power converter stages in either a half bridge mode or a full bridge mode. In the full bridge mode the voltage at the first and second ports of the power converter stages may be equal. For example, the full bridge mode may transfer all of the input voltage to the first side of the respective transformer. In the half bridge mode the voltage at the first port may be half that of the second port of the power converter stages. For example, the half bridge mode may transfer half of the input voltage to the first side of the respective transformer. When combined with operating the interleaved multi-bridge circuit in either the series or parallel mode, this provides for an even wider DC voltage at the DC terminal of the interleaved multi-bridge circuit. For example, the controller may operate the power converter stages in the half bridge mode while operating the interleaved multi-bridge circuit in the parallel mode. The controller can switch to operating the power converters in the full bridge mode and the interleaved multi-bridge circuit in the series mode. The two foregoing combinations may provide for a 1:4 voltage range at the DC terminal, while maintaining high efficiency. Other DC voltage ranges are possible at the DC terminal of the interleaved multi-bridge circuit, while still maintaining high efficiency.

Some power converters may use mechanical DC contacts to change a physical configuration in order to obtain a different DC voltage output. However, such power converters may be bulky. Also, mechanical DC contacts have a limited lifetime. Furthermore, such configurations cane be costly to manufacture. Embodiments of power converters disclosed herein have a controller that applies control signals to control gates in an interleaved multi-bridge circuit and/or the power converter stages, which provides for a compact solution. Moreover, embodiments of power converters disclosed herein have a long lifetime. Furthermore, embodiments of power converters disclosed herein can be manufactured economically.

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

FIG. 1 is a diagram of one embodiment of power converter. The power converter 100 is capable of bi-directional power flow, in one embodiment. For example, the direction of power flow may be from the power converter stages 104a, 104b to the interleaved multi-bridge circuit 102. In another example, the direction of power flow may be from the interleaved multi-bridge circuit 102 to the power converter stages 104a, 104b. The power converter 100 is able to generate a DC Voltage (at a DC terminal 107 of the interleaved multi-bridge circuit 102) having a wide DC voltage range, while maintaining high efficiency, in one embodiment. The interleaved multi-bridge circuit 102 is able have a DC Voltage input having a wide DC voltage range, with the power converter 100 maintaining high efficiency, in one embodiment.

The power converter 100 has two power converter stages 104a, 104b, two transformers T1, T2, an interleaved multi-bridge circuit 102, and a controller 106. In FIG. 1, the transformers T1, T2 are shown as having subtractive polarity; however, additive polarity is another option. Note that the transformers (T1, T2) may provide electrical isolation between the interleaved multi-bridge circuit 102 and the power converter stages 104a, 104b. Thus, the transformers (T1, T2) may provide electrical isolation between the DC terminal 107 (e.g., DC Voltage) of the interleaved multi-bridge circuit 102 and the voltage (V1a, V2a) at the respective second ports 111a, 111b of the power converter stages 104a, 104b. Transformer T1 has terminals A, B, C, D. Transformer T2 has terminals E, F, G, and H.

The first port 113a, 113b of each power converter stage 104a, 104b is connected to the first side 109a of one of the transformers. For example, the first port 113a of power converter stage 104a is connected to the first side 109a of transformer T1, whereas the first port 113b of power converter stage 104b is connected to the first side 109a of transformer T2. Each power converter stage 104a, 104b has a second port 111a, 111b that receives or provides a voltage (V1a or V1b). Each power converter stage 104a, 104b is configured to transfer power between its first port 113a, 113b and respective second port 111a, 111b. The power converter stage 104a, 104b may receive an input voltage (e.g., V1a or V2a) at it second port 111a, 111b and transfer power to its respective first port 113a, 113b (thereby providing V2a to first port 113a, and V2b to first port 113b), when transfer of power is in the direction from the second port 111a, 111b to the first port 113a, 113b. The power converter stage 104a, 104b may receive an input voltage (e.g., V2a or V2b) at it first port 113a, 113b and transfer power to its second port 111a, 111b (thereby providing V1a to second port 111a, or V1b to second port 111b), when transfer of power is in the direction from the first port 113a, 113b to the respective second port 111a, 111b. The direction of power flow depends on the location of an energy source, in one embodiment.

The interleaved multi-bridge circuit 102 has a first terminal 115a that is connected to the second side 109b of transformer T1, and a second terminal 115b that is connected to the second side 109b of transformer T2. The interleaved multi-bridge circuit 102 has a DC terminal 107 (which provides or receives a DC Voltage and a DC Current, depending on the direction of power flow).

In one embodiment, an energy source may be provided at the second ports 111a, 111b, wherein power may flow from the power converter stages 104a, 104b to the interleaved multi-bridge circuit 102. In one embodiment, an energy source may be provided at the DC terminal 107, wherein power may flow from the interleaved multi-bridge circuit 102 to the power converter stages 104a, 104b.

The controller 106 is configured to operate the interleaved multi-bridge circuit 102 in a parallel mode in which the second sides 109b of the transformers T1, T2 are connected in parallel at the DC terminal 107. The controller 106 is configured to operate the interleaved multi-bridge circuit 102 in a series mode in which the second sides 109b of the transformers T1, T2 are connected in series at the DC terminal 107. When in the series mode, the voltage at the DC terminal 107 may be twice the voltage relative to being in the parallel mode, assuming the same voltage at the second sides 109b of transformers T1, T2. This helps to provide a wider range in DC voltage at the DC terminal 107.

The controller 106 is configured to operate each power converter stage 104a, 104b in a full bridge mode and a half bridge mode, in one embodiment. In the full bridge mode, V1a may equal V2a (likewise V1b may equal V2b). For example, each power converter stage 104a, 104b may provide its full input voltage (V1a or V1b) from its second port 111a, 111b its respective first port 113a, 113b, when power flow is from the second port 111a, 111b to the respective first port 113a, 113b. In the half bridge mode, V2a may be half V1a (likewise V2b may be half V1b). For example, each power converter stage 104a, 104b may provide its half the input voltage (V1a or V1b) from its second port 111a, 111b to its respective first port 113a, 113b, when power flow is from the second port 111a, 111b to the first port 113a, 113b.

The controller 106 is configured to switch the power converter stages 104a, 104b between the full bridge mode and the half bridge mode while the interleaved multi-bridge circuit 102 is in the series mode, in one embodiment. The controller 106 is configured to switch the power converter stage 104a, 104b between the full bridge mode and the half bridge mode while the interleaved multi-bridge circuit 102 is in the parallel mode, in one embodiment.

The controller 106 is configured to switch the interleaved multi-bridge circuit 102 between the series mode and the parallel mode while the power converter stages 104a, 104b are in the full bridge mode, in one embodiment. The controller 106 is configured to switch the interleaved multi-bridge circuit 102 between the series mode and the parallel mode while the power converter stages 104a, 104b are in the half bridge mode, in one embodiment. The various combinations of half/full bridge mode and series/parallel mode allow for a large range in voltage at the DC terminal 107. For example, the controller may operate the power converter stages 104a, 104b in the half bridge mode while operating the interleaved multi-bridge circuit 102 in the parallel mode. The controller can switch to operating the power converters 104a, 104b in the full bridge mode and the interleaved multi-bridge circuit 102 in the series mode. The two foregoing combinations may provide for a 1:4 voltage range at the DC terminal 107. For example, for the combination of the half bridge mode and parallel mode there may be 200V at the DC terminal 107, whereas for the combination of the full bridge mode and series mode there may be 800V at the DC terminal 107, as one example.

The controller 106 is shown as outputting control signals to the interleaved multi-bridge circuit 102, and the power converter stages 104a, 104b. The controller 106 may also input one or more signals in order to determine how to regulate the interleaved multi-bridge circuit 102 and/or the power converter stages 104a, 104b. For example, the controller 106 could input the DC Voltage (at DC terminal 107), DC Current (at DC terminal 107), V1a at second port 111a, V1b at second port 111b, V2a at first port 113a, or V2b at second port 113b, etc. In one embodiment, the controller 106 uses pulse width modulation to control the power converter stages 104a, 104b and/or the interleaved multi-bridge circuit 102. In one embodiment, the controller 106 uses frequency modulation to control the power converter stages 104a, 104b and/or the interleaved multi-bridge circuit 102. In one embodiment, the controller 106 uses a combination of pulse width modulation and frequency modulation to control the power converter stages 104a, 104b and/or the interleaved multi-bridge circuit 102.

Figure 7A:
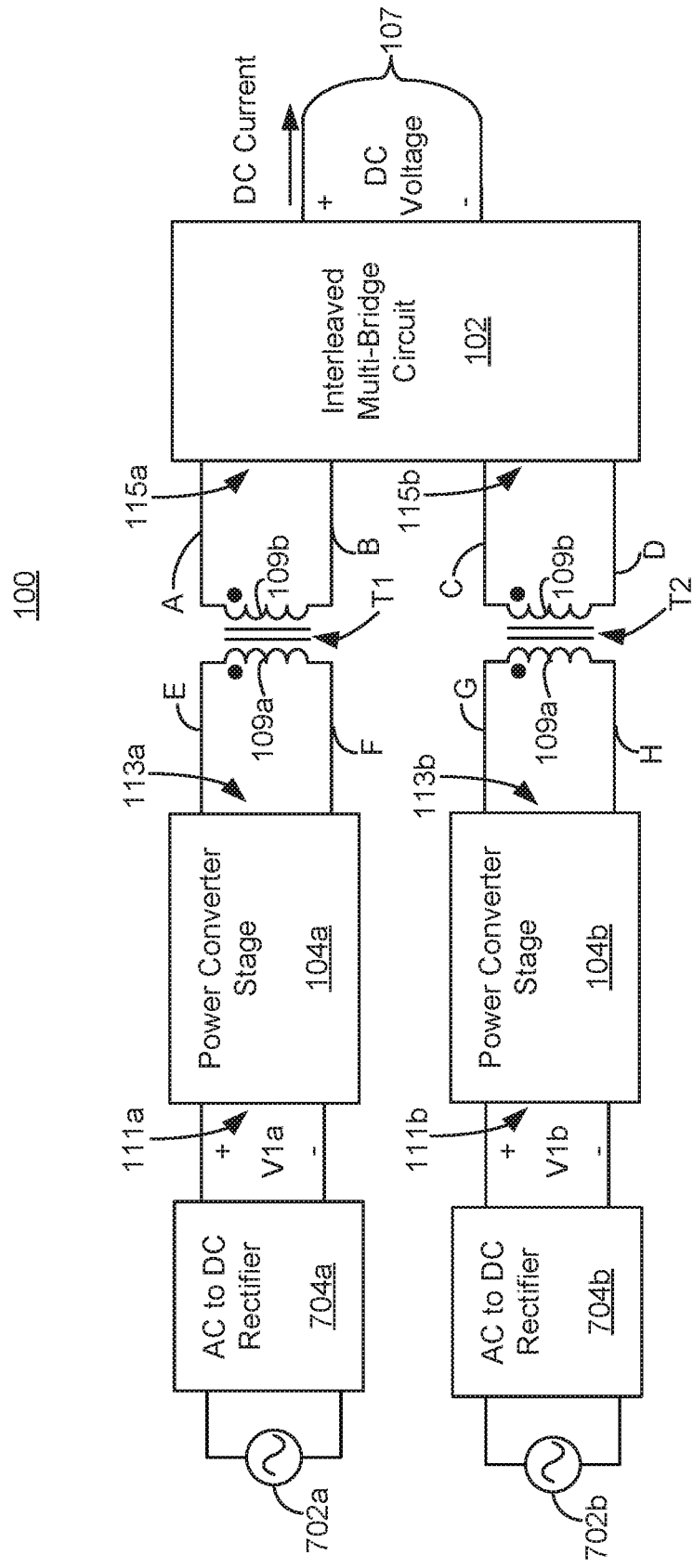
FIG. 7A shows one embodiment of a power converter having two AC to DC rectifiers.
Figure 7B:
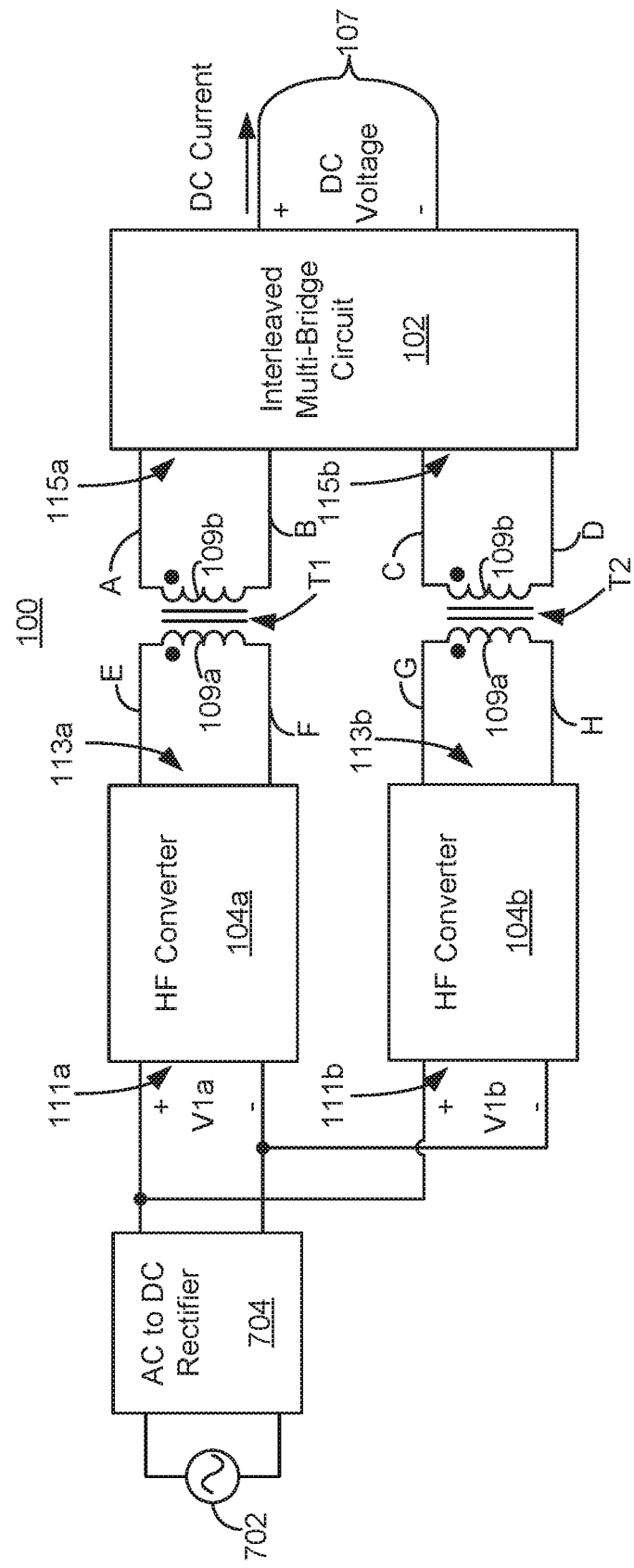
FIG. 7B shows one embodiment of a power converter having a single AC to DC rectifier that is shared by the two power converter stages.

Note that the power converter 100 of FIG. 1 is used in an AC to DC converter, in one embodiment. FIGS. 7A and 7B, to be discussed below, show two embodiments of AC to DC converters. The power converter 100 of FIG. 1 is used in a DC to DC converter, in some embodiments.

Figure 2A:
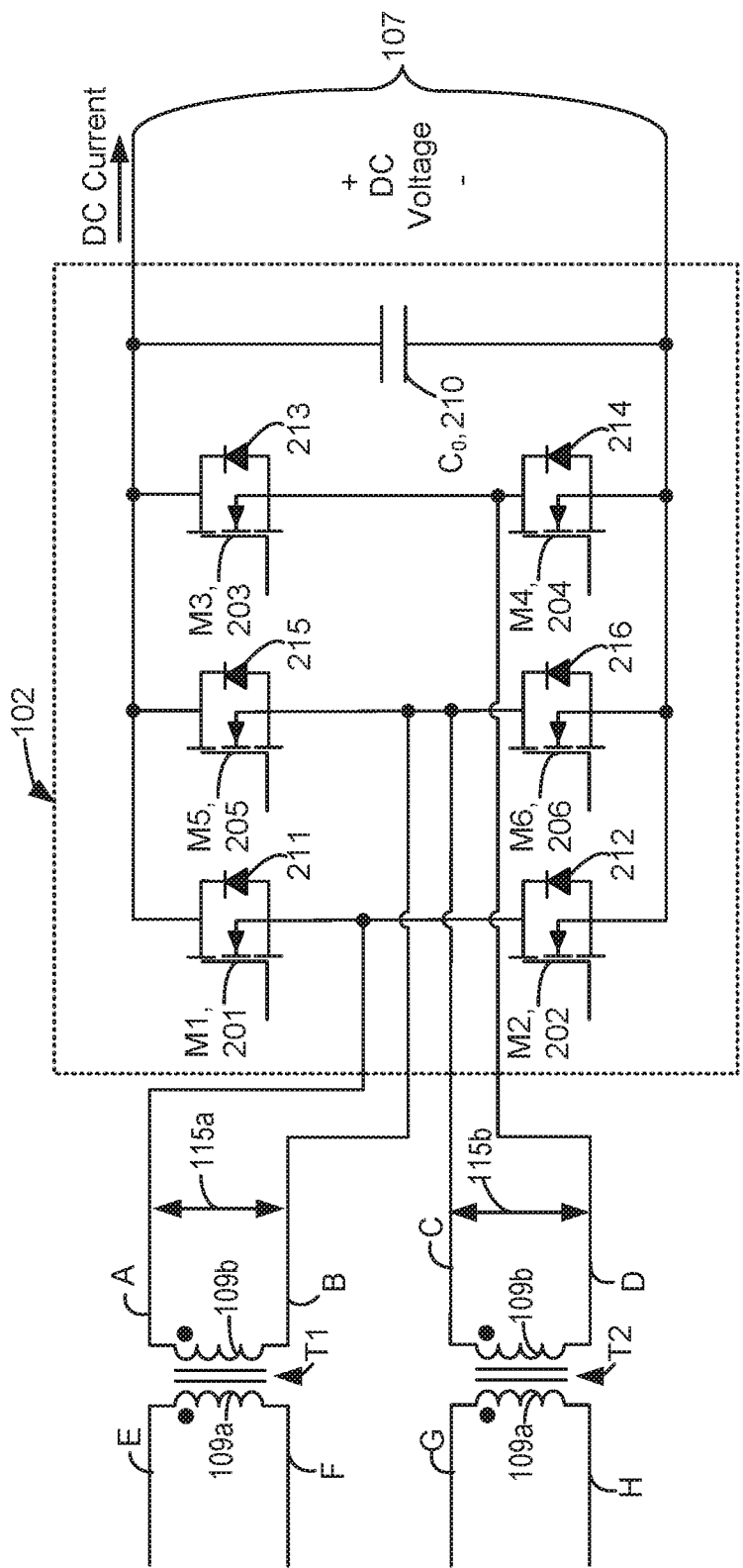
FIG. 2A is a diagram of one embodiment of an interleaved multi-bridge circuit.

FIG. 2A is a diagram of one embodiment of an interleaved multi-bridge circuit. The interleaved multi-bridge circuit 102 may be used in the power converter 100 of FIG. 1. As the term is used herein, a "multi-bridge" circuit has three or more bridges. The interleaved multi-bridge circuit 102 is depicted with three bridges, but could have additional bridges. The interleaved multi-bridge circuit 102 has switch M1 201 and switch M2 202, which together form a first bridge; switch M3 203 and switch M4 204, which together form a second bridge; and switch M5 205 and switch M6 206, which together form a third bridge. The interleaved multi-bridge circuit 102 also has capacitor $C_O$ 210. The DC terminal 107 is across capacitor $C_O$ 210, in this embodiment. Switch M1 201, switch M5 205, and switch M3 203 each have a terminal connected to one terminal of capacitor 210. Switch M2 202, switch M6 206, and switch M4 204 each have a terminal connected to the other terminal of capacitor 210.

The source of M1 201 and the drain of M2 202 are connected to terminal A, which is at the positive polarity of the second side 109b of transformer T1. The source of M5 205 and the drain of M6 206 are connected to terminal B, which is at the negative polarity of the second side 109b of transformer T1. The source of M5 205 and the drain of M6 206 are connected to terminal C, which is at the positive polarity of the second side 109b of transformer T2. The source of M3 203 and the drain of M4 204 are connected to terminal D, which is at the negative polarity of the second side 109b transformer T2. Terminal B and C are electrically connected, indicating that the negative polarity of the second side 109b of transformer T1 is electrically connected to the positive polarity of the second side 109b of transformer T2, in this embodiment.

Switches M1-M6 (201-206) may each be implemented as a metal-oxide-semiconductor field-effect transistor (MOSFET), insulated-gate bipolar transistor (IGBT), or bipolar junction transistor (bipolar transistor or BJT), but are not limited thereto. In FIG. 2A, switches M1-M6 (201-206) are depicted as NMOS devices, showing an inherent body diode. Note that the inherent body diode is not a separate element.

Each switch M1-M6 is in parallel with a diode, in the embodiment of FIG. 2A. For example, switch M1 201 is in parallel with diode 211, switch M2 202 is in parallel with diode 212, switch M3 203 is in parallel with diode 213, switch M4 204 is in parallel with diode 214, switch M5 205 is in parallel with diode 215, and switch M6 206 is in parallel with diode 216. The anode of diode 211 is connected to the cathode of diode 212 (at terminal A). The anode of diode 215 is connected to the cathode of diode 216 (at terminals B and C). The anode of diode 213 is connected to the cathode of diode 214 (at terminal D). The cathodes of diodes 211, 213, and 215 are connected to the positive terminal of the DC terminal 107. The anodes of diodes 212, 214, and 216 are connected to the negative terminal of the DC terminal 107.

Figure 2B:
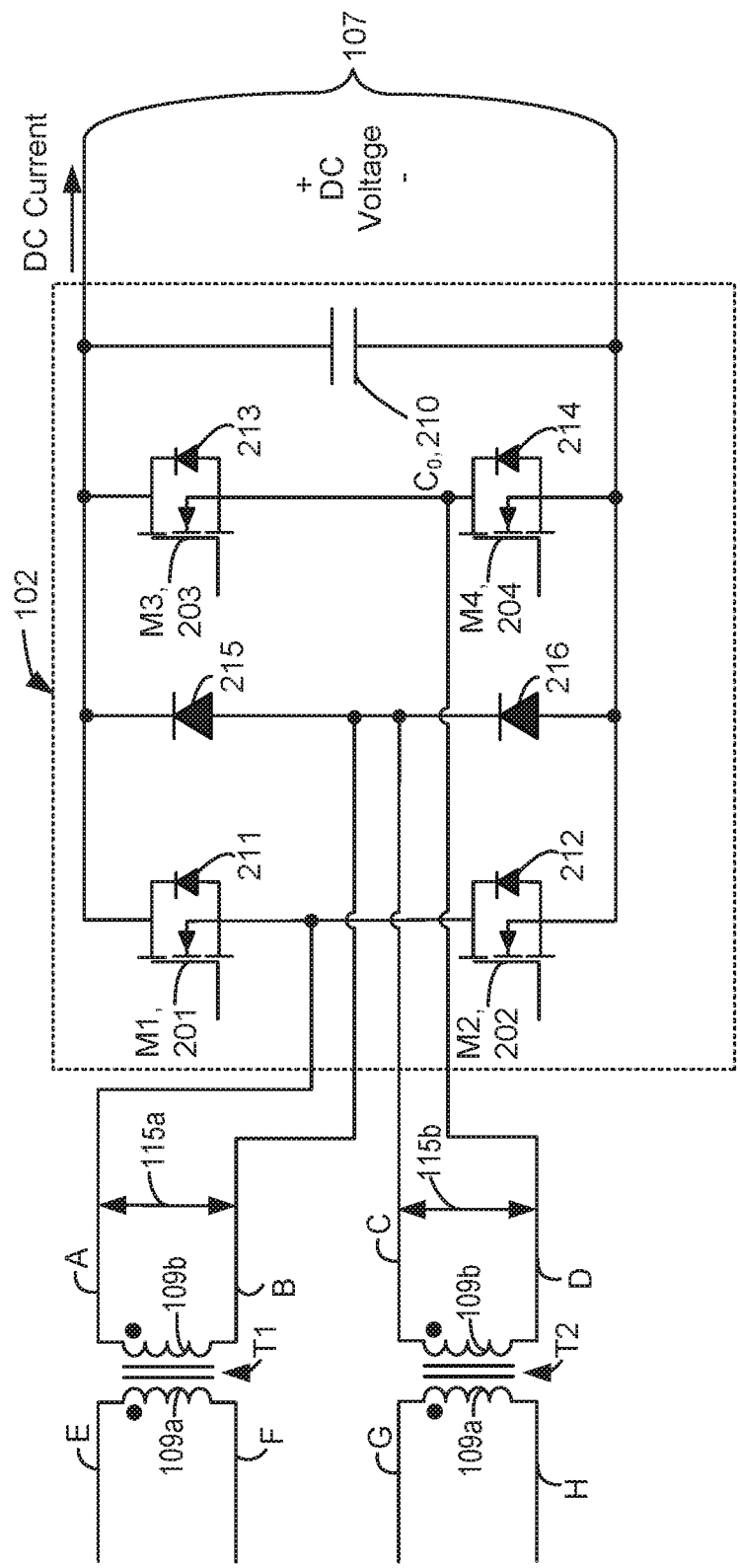
FIG. 2B is a diagram of one embodiment of an interleaved multi-bridge circuit that may be a lower cost alternative to the one of FIG. 2A.

FIG. 2B is a diagram of an embodiment of an interleaved multi-bridge circuit 102 that may be a lower-cost alternative to the interleaved multi-bridge circuit of FIG. 2A. The interleaved multi-bridge circuit 102 of FIG. 2B may be used in the power converter 100 of FIG. 1. The interleaved multi-bridge circuit 102 of FIG. 2B has switch M1 201 and switch M2 202, which together form a first bridge; switch M3 203 and switch M4 204, which together form a second bridge; and diodes 215 and 216, which together form a third bridge. Using the diodes 215 and 216 as the third bridge instead of switches M5 205, M6 206 may save cost. The interleaved multi-bridge circuit 102 also has capacitor $C_O$ 210. The DC terminal 107 is across capacitor $C_O$ 210, in this embodiment.

FIG. 2C depicts voltage waveforms during operation of one embodiment of a series configuration of the interleaved multi-bridge circuit 102 of FIG. 2A. The voltage waveforms labeled M1-M6 represent voltages that one embodiment of the controller 106 applies to control terminals (e.g., gates) of switches M1-M6 (201-206). The voltage $V_{AB}$ 250 represents the voltage across the second side 109b of transformer T1 in FIG. 1 (between terminals A and B). The voltage $V_{CD}$ 252 represents the voltage across the second side 109b of transformer T2 in FIG. 1 (between terminals C and D). Between time t0 and t1, the M1/M4 control voltage 254 applied to the control terminals (e.g., gates) of switches M1 201 and M4 204 are high, which turns on those switches. Between time t0 and t1, the M2/M3 control voltage 256 applied to the control terminals (e.g., gates) of switches M2 202 and M3 203 are low, which turns off those switches. In this configuration, switch M1 201 connects terminal A to one side the DC terminal 107 of the interleaved multi-bridge circuit 102, and switch M4 204 connects terminal D to the other side of the DC terminal 107 of the interleaved multi-bridge circuit 102. Note that terminals B and C are connected in the interleaved multi-bridge circuit 102. Thus, the second sides 109b of the transformers T1, T2 are connected in series at the DC terminal 107 of the interleaved multi-bridge circuit 102. Therefore, the voltage at the DC terminal 107 may be equal to the summation of the voltages of the second sides 109b of the transformers T1, T2.

Between time t1 and t2, the M1/M4 control voltage 254 applied to the control terminals (e.g., gates) of switches M1 201 and M4 204 is low, which turns those switches off. Between time t1 and t2, the M2/M3 control voltage 256 to switches M2 202 and M3 203 is high, which turns those switches on. In this configuration, switch M2 202 connects terminal A to one side of the DC terminal 107 of the interleaved multi-bridge circuit 102, and switch M3 203 connects terminal D to the other side of the DC terminal 107 of the interleaved multi-bridge circuit 102. Thus, the second sides 109b of the transformers T1, T2 are connected in series at the DC terminal 107 of the interleaved multi-bridge circuit 102. Note that the M5/M6 control voltage 258 that is applied to switches M5 205 and M6 206 is low throughout the series configuration, such that M5 205 and M6 206 are off throughout the series configuration.

FIG. 2D depicts voltage waveforms during operation of one embodiment of a parallel configuration of the interleaved multi-bridge circuit 102 of FIG. 2A. The waveforms depict the voltage $V_{AB}$ 260, which is the voltage across the second side 109b of transformer T1; and voltage $V_{CD}$ 262, which is the voltage across the second side 109b of transformer T2. The voltage applied by one embodiment of controller 106 to the control terminals (e.g., gates) of the various switches in the interleaved multi-bridge circuit 102 are also depicted. Between time t0 and t1, the M1/M3/M6 control voltage 264 applied to the control terminals (e.g., gates) of switches M1 201, M3 203, and M6 206 is high, which turns those switches on. Between time t0 and t1, the M2/M4/M5 control voltage 266 applied to the control terminals (e.g., gates) of switches M2 202, M4 204, and M5 205 is low, which turns those switches off. In this configuration, switch M1 201 connects terminal A and switch M3 201 connects terminal D to the positive side of the DC terminal 107, and switch M6 206 connects terminals B and C to the negative side of the DC output. Thus, the second sides 109b of the transformers T1, T2 are connected in parallel at the DC terminal 107 of the interleaved multi-bridge circuit 102. Therefore, the voltage at the DC terminal 107 may be equal to the voltage of the second side 109b transformer T1. Likewise, the voltage of the second side 109b transformer T2. However, the DC current at the DC terminal 107 may be equal to the summation of the currents of the second sides 109b of the transformers T1, T2.

Between time t1 and t2, the M2/M4/M5 control voltage 266 applied to the control terminals (e.g., gates) of switches M2 206, M4 204, and M5 206 is high, which turns those switches on. Between time t0 and t1, the M1/M3/M6 control voltage 264 applied to the control terminals (e.g., gates) of switches M1 201, M3 203, and M6 206 is low, which turns those switches off. In this configuration, switch M2 202 connects terminal A and switch M4 204 connects terminal D to the negative side of the DC terminal 107, and switch M5 205 connects terminals B and C to the positive side of the DC terminal 107. Thus, the second sides 109b of the transformers T1, T2 are connected in parallel at the DC terminal 107.

The waveforms of FIGS. 2C and 2D may be modified for use with the circuit of FIG. 2B, as follows. A difference between the multi-bridge circuit 102 in FIG. 2B relative to the multi-bridge circuit 102 in FIG. 2A, is that the multi-bridge circuit 102 in FIG. 2B does not have active switches M5 205 and M6 206. The waveforms of FIG. 2C may be adapted for the multi-bridge circuit 102 in FIG. 2B by simply not using M5/M6 control voltage 258. The waveforms of FIG. 2D may be adapted for the multi-bridge circuit 102 in FIG. 2B by applying M1/M3/M6 control voltage 264 to the control terminals of M1 201 and M3 203; and applying M2/M4/M5 control voltage 266 to the control terminals of M2 202 and M4 204.

Figure 3A:
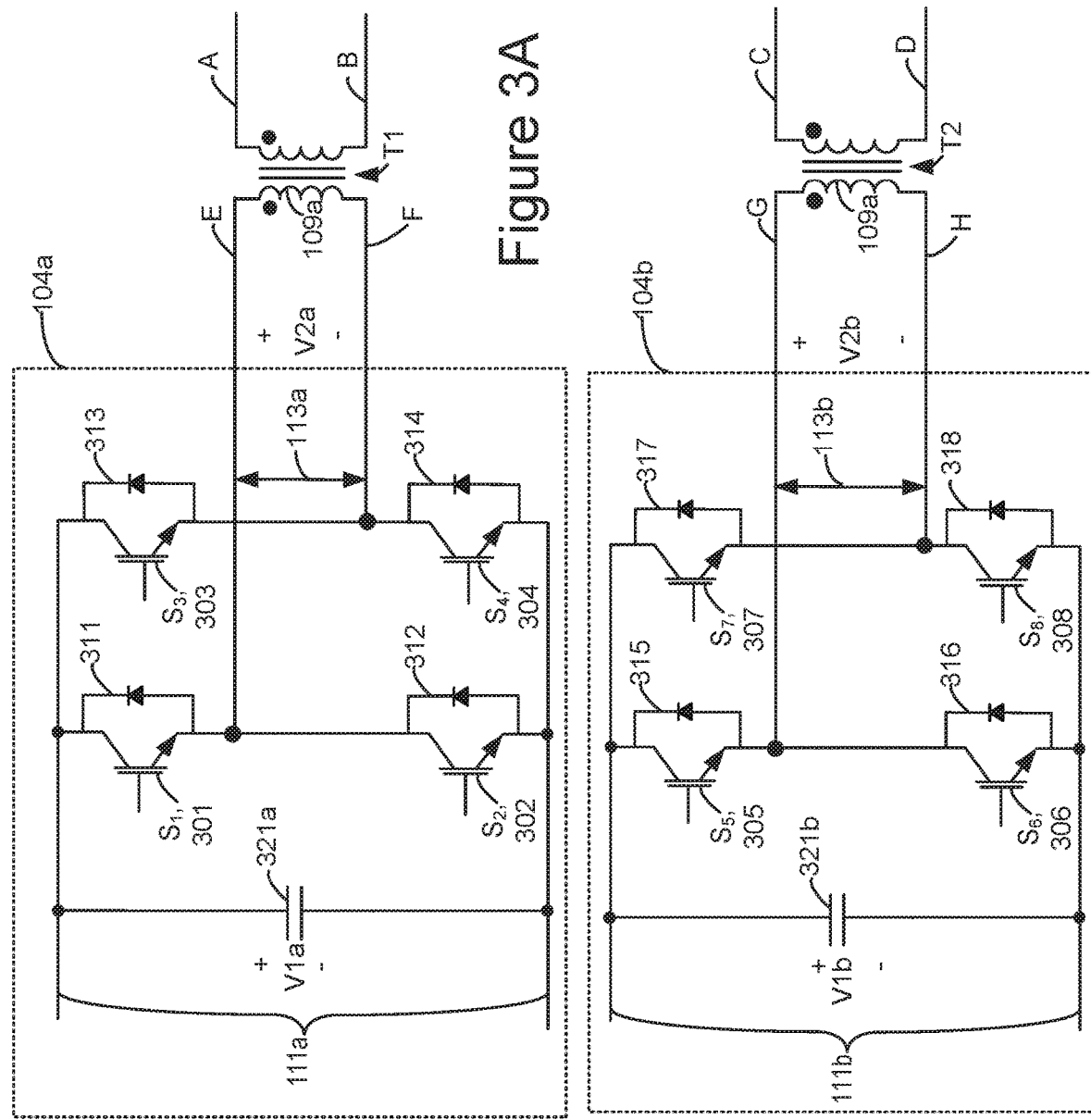
FIGS. 3A-3F depict embodiments of power converter stages, which may be used in the power converter in FIG. 1.

FIG. 3A depicts one embodiment of power converter stages 104a and 104b, respectively, which may be used together in the power converter 100 in FIG. 1. The circuit is used with the multi-bridge circuit 102 depicted in FIG. 2A in one embodiment. The configuration in FIG. 3A may be referred to as a two-level full-bridge phase-shift converter. The power converter stages 104a, 104b may be used as a dual active bridge (DAB), in this embodiment. Note that using the DAB in the power converter 100 allows for a very high power rating. For example, the power rating can be 100 kW, or even higher.

The power converter stage 104a has switch S1 301, which is in parallel with diode 311; switch S2 302, which is in parallel with diode 312; switch S3 303, which is in parallel with diode 313; and switch S4 304, which is in parallel with diode 314. The power converter stage 104a has a capacitor 321a, which is connected across the second port 111a of the power converter stage 104a. The voltage (V1a) is across capacitor 321a. Switches S1 301 and S2 302 are connected in series across the input, in this embodiment. Likewise, switches S3 303 and S4 304 are connected in series across the second port 111a, in this embodiment. The emitter of switch 301 and the collector of switch S2 302 are connected to terminal E, which is one terminal of the first port 113a of the power converter stage 104a. Terminal F is connected to the emitter of switch S3 303 and the collector of switch S4 304. Note that terminals E and F in FIG. 3A correspond to terminals E and F in FIG. 1. Thus, terminal E may be connected to the positive polarity of the first side 109a of transformer T1, and terminal F may be connected to the negative polarity of the first side 109a of transformer T1.

Power converter stage 104b is similar to power converter stage 104a. Power converter stage 104b has switch S5 305, which is in parallel with diode 315; switch S6 306, which is in parallel with diode 316; switch S7 307, which is in parallel with diode 317; and switch S8 308, which is in parallel with diode 318. The power converter stage 104b has a capacitor 321b, which is connected across the second port 111b of the power converter stage 104b. The voltage (V1b) is across capacitor 321b. Switches S5 305 and S6 306 are connected in series across the second port 111b, in this embodiment. Likewise, switches S7 307 and S8 308 are connected in series across the second port 111b, in this embodiment. The emitter of switch S5 305 and the collector of switch S6 306 are connected to terminal G, which is one terminal of the first port 113b of the power converter stage 104b. Terminal H is connected to the emitter of switch S7 307 and the collector of switch S8 308. Note that terminals G and H in FIG. 3A correspond to terminals G and H in FIG. 1. Thus, terminal G may be connected to the positive polarity of the first side 109a of transformer T2, and terminal H may be connected to the negative polarity of the first side 109a of transformer T2.

In one embodiment, the controller 106 uses double phase shift control for a power converter 100 having a pair of DABs, such as in FIG. 3A. Double phase shift control includes regulating the way in which control signals are applied to control gates in the interleaved multi-bridge circuit 102. Double phase shift control, in one embodiment, shifts the timing of the control signals (e.g., the gating) in the interleaved multi-bridge circuit 102 relative to the timing of the control signals in the pair of DABs. Double phase shift control may improve the performance of the pair of DABs. For example, double phase shift control may be able to maintain zero-voltage switching (ZVS) over a wider range of operating condition. Therefore, switching losses may be reduced.

Figure 3B:
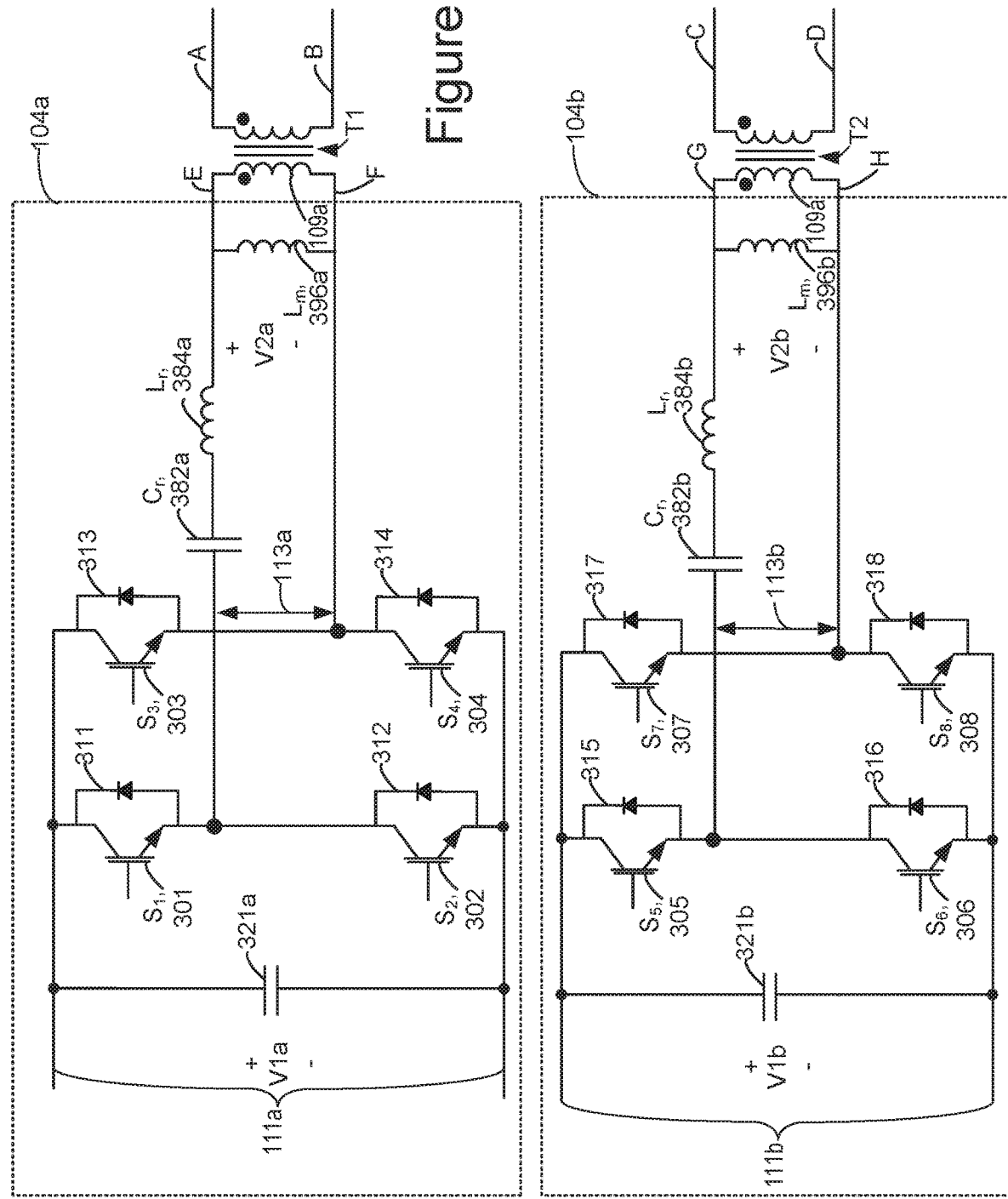

FIG. 3B depicts one embodiment of power converter stages 104a and 104b, respectively, which may be used together in the power converter 100 in FIG. 1. The circuit is used with the multi-bridge circuit 102 depicted in FIG. 2A in one embodiment. This configuration may be referred to as a two-level full-bridge LLC converter. This configuration has some transistors in common with the configuration of FIG. 3A, which will not be described in detail again.

Power converter stage 104a has a resonant inductor ($L_r$) 384a, excitation inductor ($L_m$) 396a, and resonant capacitor ($C_r$) 382a. Note that these circuit elements represent the resonant inductance, excitation inductance and resonant capacitance in an LLC series resonant converter. In one embodiment, the LLC series resonant converter is operated near the resonant frequency, which is very efficient. In one embodiment, zero-voltage switching (ZVS) is retained by operating near the resonant frequency. ZVS is one example of a soft switching technique. Soft switching techniques may improve power efficiency by reducing switching losses.

The emitter of switch S1 301 and the collector of switch S2 302 are connected to the series combination of resonant inductor ($L_r$) 384a and resonant capacitor ($C_r$) 382a. The series combination of resonant inductor ($L_r$) 384a and resonant capacitor ($C_r$) 382a are connected to terminal E, which is one terminal of the first port 113a of the power converter stage 104a. Terminal F is connected to the emitter of switch S3 303 and the collector of switch S4 304. The excitation inductor ($L_m$) is connected between terminal E and F, across the first port 113a of power converter stage 104a.

Power converter stage 104b is similar to power converter stage 104a. Power converter stage 104b has a resonant inductor ($L_r$) 384b, excitation inductor ($L_m$) 396b, and resonant capacitor ($C_r$) 382b. The emitter of switch S5 305 and the collector of switch S6 306 are connected to the series combination of resonant inductor ($L_r$) 384b and resonant capacitor ($C_r$) 382b. The series combination of resonant inductor ($L_r$) 384b and resonant capacitor ($C_r$) 382b are connected to terminal G, which is one terminal of the first port 113b of the power converter stage 104b. Terminal H is connected to the emitter of switch S7 307 and the collector of switch S8 308. The excitation inductor ($L_m$) 396b is connected between terminals G and H, across the first port 113b of power converter stage 104b.

The circuit components in FIGS. 3A and 3B are largely similar, and hence in some cases have been given the similar reference numerals. However, the switches have been given different reference numerals to facilitate discussion of the switching of those transistors. Furthermore, note that although the switches S1-S8 (301-308) are depicted as insulted gate bipolar transistors (IGBT) in FIGS. 3A and 3B, the switches are not required to be insulted gate bipolar transistors. In one embodiment, switches S1-S8 (301-308) are replaced with MOSFET transistors.

Figure 3C:
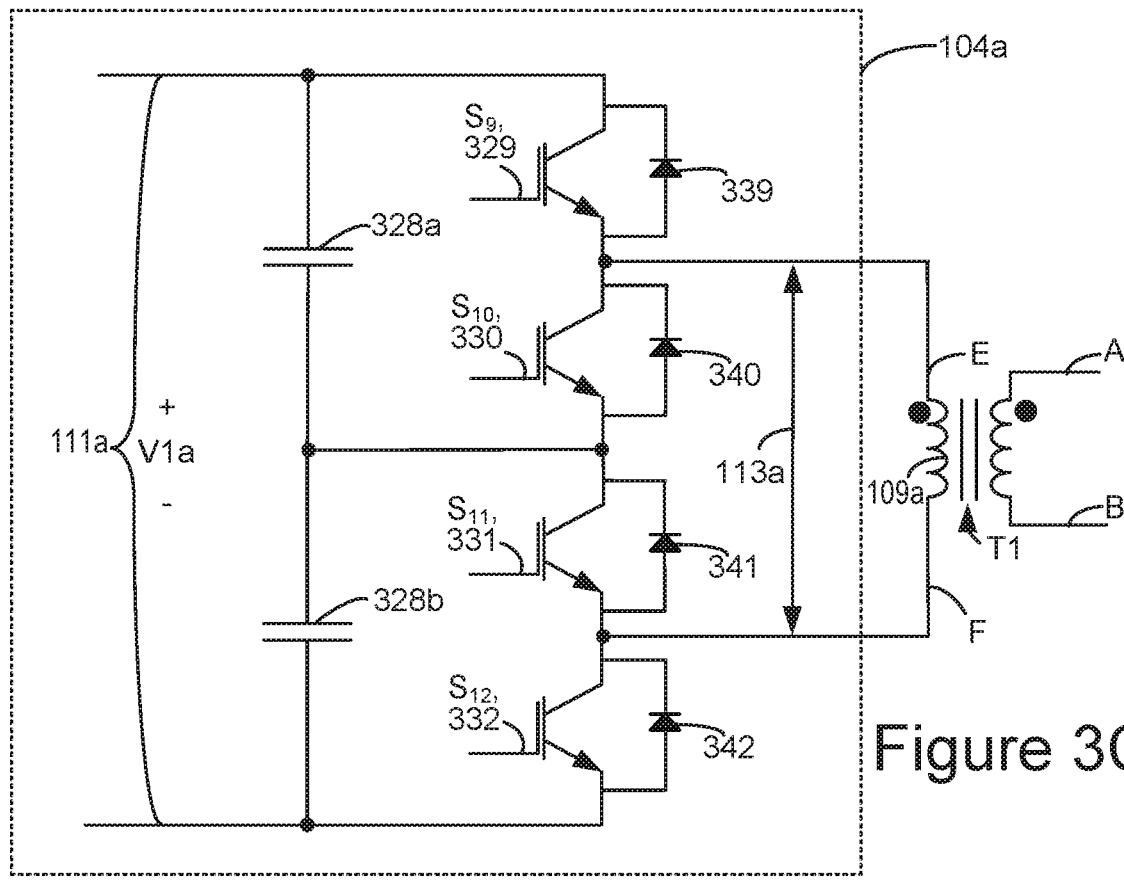
Figure 3C:
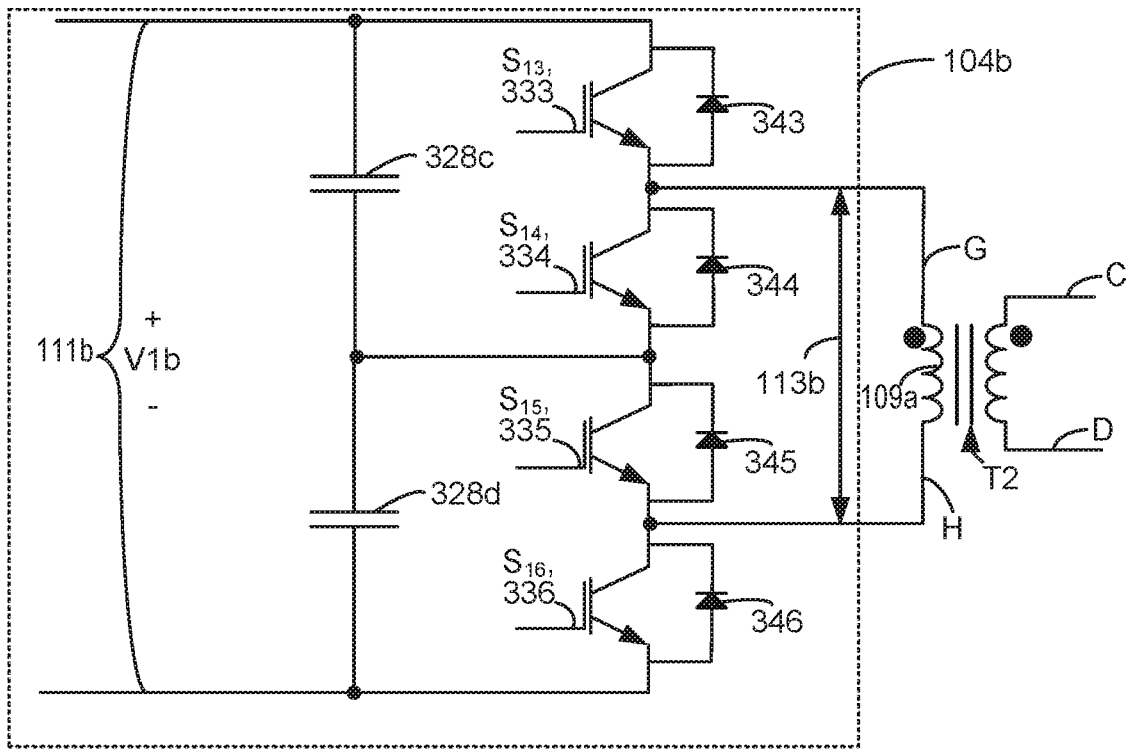
Figure 3D:
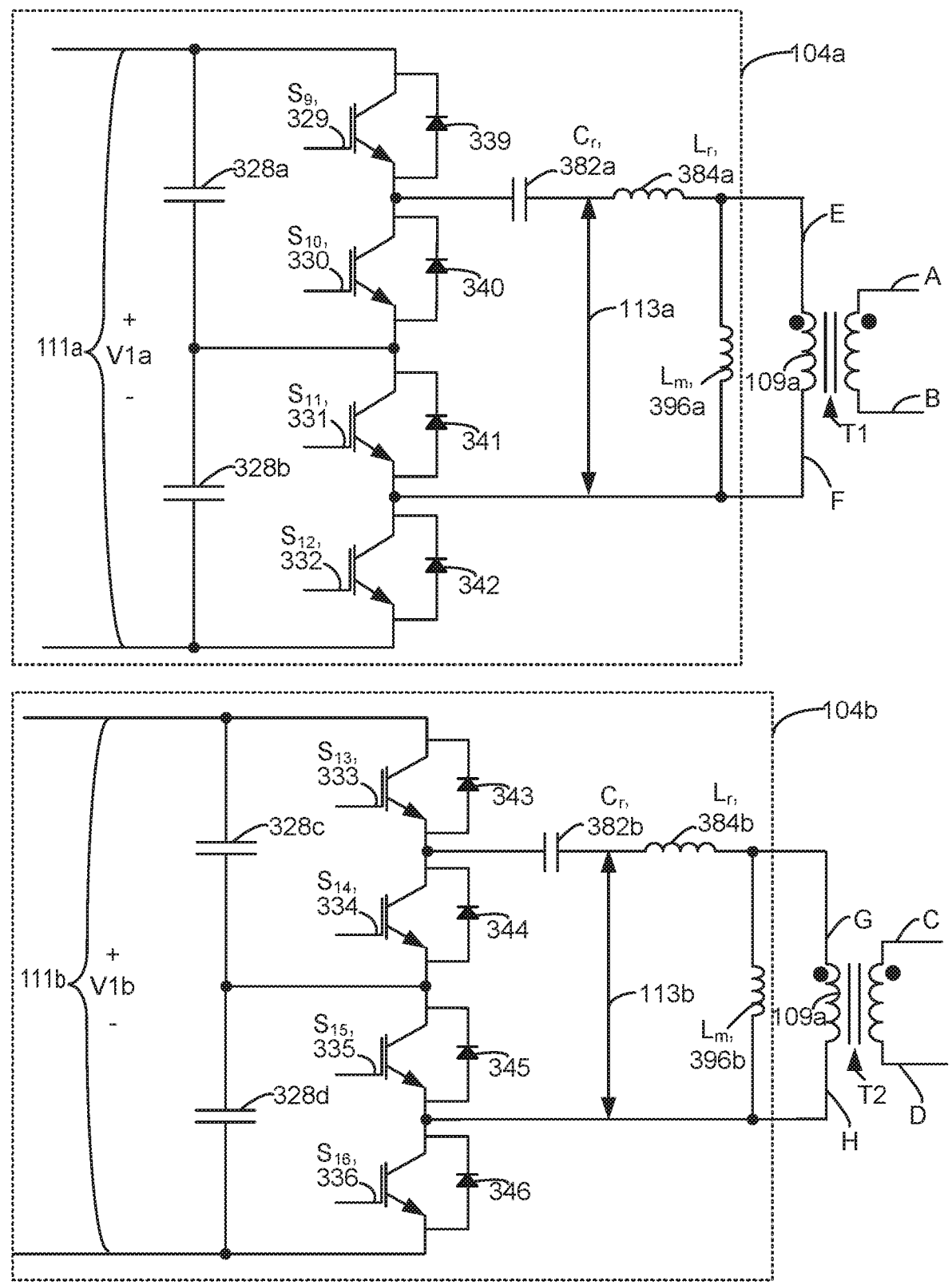

There are many possible configurations for the power converter stages 104a, 104b. FIGS. 3C and 3D depict another embodiment of power converter stages 104a, 104b, respectively, which may be used in the power converter 100 in FIG. 1. The power converter stages 104a, 104b in FIGS. 3C and 3D may be used together with the interleaved multi-bridge circuit 102 depicted in FIG. 2A.

FIG. 3C depicts one embodiment of a three-level half-bridge phase-shift converter. The circuit is used with the multi-bridge circuit 102 depicted in FIG. 2A in one embodiment. The power converter stage 104a of FIG. 3C has capacitors 328a and 328b, which are connected in series across the second port 111a of the power converter stage 104a. Thus, the voltage (V1a) is across the series combination of capacitors 328a, 328b. In one embodiment, capacitors 328a, 328b have the approximately same capacitance. Thus, during operation, half of the voltage (V1a) appears across each capacitor 328a, 328b, in one embodiment. Note that there may be some difference between the capacitance of capacitors 328a, 328b due to, for example, less than 100 percent precision in manufacturing. Hence, during operation, the voltage V1a might not be exactly evenly divided across the capacitors 328a, 328b.

Switches S9 329, S10 330, S11 331, and S12 332 are connected in series across the second port 111a, in this embodiment. The collector of switch S9 329 is connected to the positive side of the second port 111a. The emitter of switch S9 329 is connected to the collector of switch S10 330. The emitter of switch S10 330 is connected to the collector of switch S11 331. The emitter of switch S11 331 is connected to the collector of switch S12 332. The emitter of switch S12 332 is connected to the negative side of the second port 111a.

Each of the switches S9-S12 (339-332) has a diode connected in parallel. Switch S9 329 is connected in parallel with diode 339. Switch S10 330 is connected in parallel with diode 340. Switch S11 331 is connected in parallel with diode 341. Switch S12 332 is connected in parallel with diode 342.

The emitter of switch S9 329 and the collector of switch S10 330 are connected to terminal E, which is one terminal of the first port 113a of the power converter stage 104a. Terminal F is connected to the emitter of switch S11 331 and the collector of switch S12 312. Note that terminals E and F in FIG. 3C correspond to terminals E and F in FIG. 1. Thus, terminal E may be connected to the positive polarity of the first side 109a of transformer T1, and terminal F may be connected to the negative polarity of the first side 109a of transformer T1.

The power converter stage 104b of FIG. 3C has capacitors 328c and 328d, which are connected in series across the second port 111b of the power converter stage 104b. Thus, the voltage (V1a) is across the series combination of capacitors 328c, 328d. In one embodiment, capacitors 328c, 328d have the approximately same capacitance. Thus, during operation, half of the voltage (V1a) appears across each capacitor 328c, 328d, in one embodiment. Note that there may be some difference between the capacitance of capacitors 328c, 328d due to, for example, less than 100 percent precision in manufacturing. Hence, during operation, the voltage V1a might not be exactly evenly divided across the capacitors 328c, 328d.

Switches S13 333, S14 334, S15 335, and S16 336 are connected in series across the second port 111b, in this embodiment. The collector of switch S13 333 is connected to the positive side of the second port 111b. The emitter of switch S13 333 is connected to the collector of switch S14 334. The emitter of switch S14 334 is connected to the collector of switch S15 335. The emitter of switch S15 335 is connected to the collector of switch S16 336. The emitter of switch S16 336 is connected to the negative side of the second port 111b.

Each of the switches S13-S16 (333-336) has a diode connected in parallel. Switch S13 333 is connected in parallel with diode 343. Switch S14 334 is connected in parallel with diode 344. Switch S15 335 is connected in parallel with diode 345. Switch S16 336 is connected in parallel with diode 346.

The emitter of switch S13 333 and the collector of switch S14 334 are connected to terminal G, which is one terminal of the first port 113b of the power converter stage 104b. Terminal H is connected to the emitter of switch S15 335 and the collector of switch S16 316. Note that terminals G and H in FIG. 3C correspond to terminals G and H in FIG. 1. Thus, terminal G may be connected to the positive polarity of the first side 109a of transformer T2, and terminal H may be connected to the negative polarity of the first side 109a of transformer T2.

FIG. 3D depicts one embodiment of power converter stages 104a and 104b, respectively, which may be used together in the power converter 100 in FIG. 1. The circuit is used with the multi-bridge circuit 102 depicted in FIG. 2A in one embodiment. This configuration may be referred to as a three-level half-bridge LLC converter. This configuration has some transistors in common with the configuration of FIG. 3C, which will not be described in detail again.

Power converter stage 104a has a resonant inductor ($L_r$) 384a, excitation inductor ($L_m$) 396a, and resonant capacitor ($C_r$) 382a. Note that these circuit elements represent the resonant inductance, excitation inductance and resonant capacitance in an LLC series resonant converter. In one embodiment, the LLC series resonant converter is operated near the resonant frequency, which is very efficient. In one embodiment, zero-voltage switching (ZVS) is retained by operating near the resonant frequency. ZVS is one example of a soft switching technique. Soft switching techniques may improve power efficiency by reducing switching losses.

The emitter of switch S9 329 and the collector of switch S10 330 are connected to the series combination of resonant inductor ($L_r$) 384a and resonant capacitor ($C_r$) 382a. The series combination of resonant inductor ($L_r$) 384a and resonant capacitor ($C_r$) 382a are connected to terminal E, which is one terminal of the first port 113a of the power converter stage 104a. Terminal F is connected to the emitter of switch 811 331 and the collector of switch S12 332. The excitation inductor ($L_m$) is connected between terminal E and F, across the first port 113a of power converter stage 104a.

Power converter stage 104b is similar to power converter stage 104a in FIG. 3D. Power converter stage 104b has a resonant inductor ($L_r$) 384b, excitation inductor ($L_m$) 396b, and resonant capacitor ($C_r$) 382b. The emitter of switch S13 333 and the collector of switch S14 334 are connected to the series combination of resonant inductor ($L_r$) 384b and resonant capacitor ($C_r$) 382b. The series combination of resonant inductor ($L_r$) 384b and resonant capacitor ($C_r$) 382b are connected to terminal G, which is one terminal of the first port 113b of the power converter stage 104b. Terminal H is connected to the emitter of switch S15 335 and the collector of switch S16 336. The excitation inductor ($L_m$) 396b is connected between terminals G and H, across the first port 113b of power converter stage 104b.

Figure 3E:
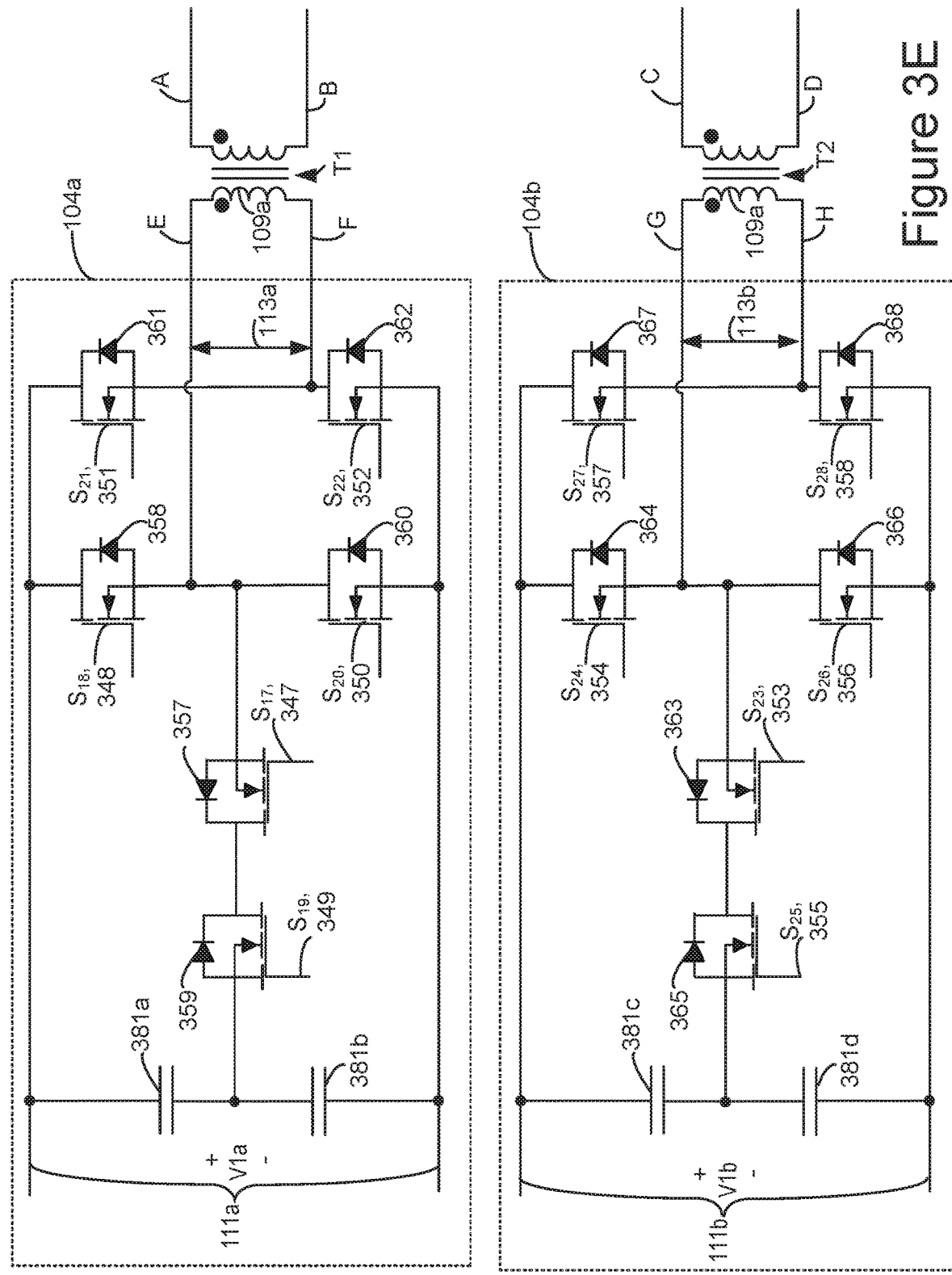

FIG. 3E depicts one embodiment of power converter stages 104a and 104b, respectively, which may be used together in the power converter 100 in FIG. 1. The circuit is used with the multi-bridge circuit 102 depicted in FIG. 2A in one embodiment. The configuration in FIG. 3E may be referred to as a three-level full-bridge phase-shift converter.

The power converter stage 104a has a capacitors 381a and 381b, which are connected in series across the second port 111a of the power converter stage 104a. The power converter stage 104a has switch S18 348 and switch S20 350, which are connected in series across the second port 111a, 111b. The power converter stage 104a has switch S21 351 and switch S22 352, which are connected in series across the second port 111a, 111b. Switch S19 349 has its source connected to the junction of capacitors 381a, 381b. The drain of switch S19 349 is connected to the drain of switch S17 347. The source of switch S17 347 is connected to terminal E. Likewise, the source of switch S18 348 and the drain of switch S20 350 are connected to terminal E. which is one terminal of the first port 113a of the power converter stage 104a. Terminal F is connected to the drain of switch S22 352 and the source of switch S21 351. Note that terminals E and F in FIG. 3A correspond to terminals E and F in FIG. 1. Thus, terminal E may be connected to the positive polarity of the first side 109a of transformer T1, and terminal F may be connected to the negative polarity of the first side 109a of transformer T1.

Power converter stage 104b is similar to power converter stage 104a in FIG. 3E. The power converter stage 104b has a capacitors 381c and 381d, which are connected in series across the second port 111a of the power converter stage 104b. The power converter stage 104b has switch S24 354 and switch S26 356, which are connected in series across the second port 111a. The power converter stage 104b has switch S27 357 and switch S28 358, which are connected in series across the second port 111a. Switch S25 355 has its source connected to the junction of capacitors 381c, 381d. The drain of switch S25 355 is connected to the drain of switch S23 353. The source of switch S23 353 is connected to terminal G. Likewise, the source of switch S24 354 and the drain of switch S26 356 are connected to terminal G. which is one terminal of the first port 113a of the power converter stage 104a. Terminal H is connected to the drain of switch S28 358 and the source of switch S27 357. Note that terminals G and H in FIG. 3E correspond to terminals G and H in FIG. 1. Thus, terminal G may be connected to the positive polarity of the first side 109a of transformer T2, and terminal H may be connected to the negative polarity of the first side 109a of transformer T2.

Figure 3F:
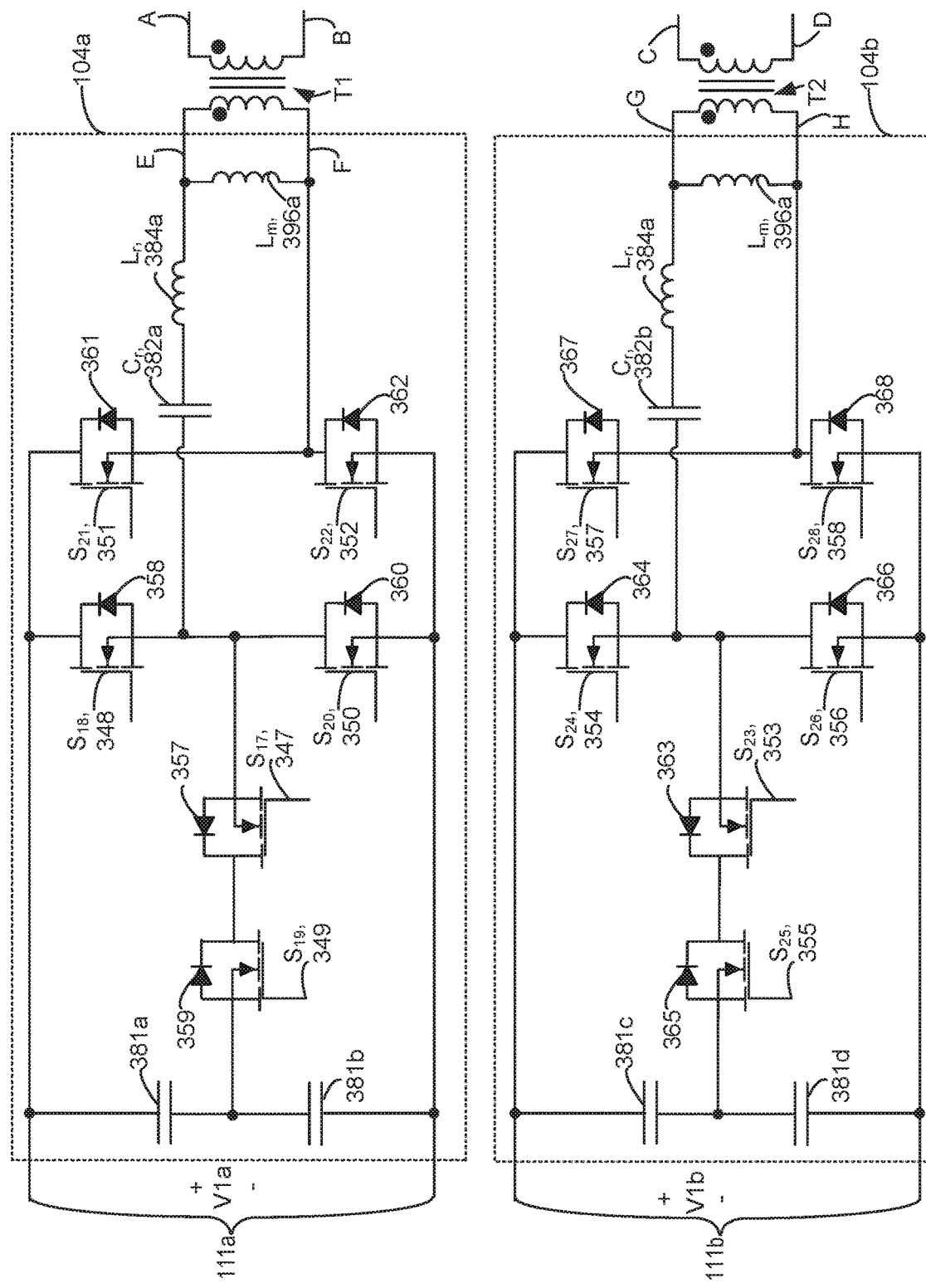

FIG. 3F depicts one embodiment of power converter stages 104a and 104b, respectively, which may be used together in the power converter 100 in FIG. 1. The circuit is used with the multi-bridge circuit 102 depicted in FIG. 2A in one embodiment. This configuration may be referred to as a three-level full-bridge LLC converter. This configuration has some transistors in common with the configuration of FIG. 3E, which will not be described in detail again.

Power converter stage 104a has a resonant inductor ($L_r$) 384a, excitation inductor ($L_m$) 396a, and resonant capacitor ($C_r$) 382a. These circuit elements represent the resonant inductance, excitation inductance and resonant capacitance in an LLC series resonant converter. In one embodiment, the LLC series resonant converter is operated near the resonant frequency, which is very efficient. In one embodiment, zero-voltage switching (ZVS) is retained by operating near the resonant frequency. Therefore, switching losses may be reduced The series connection of the resonant inductor ($L_r$) 384a and resonant capacitor ($C_r$) 382a are between terminal E and the junction of switch S18 348, switch S17 347, and switch S20 350. The excitation inductor ($L_m$) is between terminals E and F, across the first port 113a of the power converter stage 104a.

Power converter stage 104b is similar to power converter stage 104a, in FIG. 3F. Power converter stage 104b has a resonant inductor ($L_r$) 384b, excitation inductor ($L_m$) 396b, and resonant capacitor ($C_r$) 382b. The series connection of the resonant inductor ($L_r$) 384b and resonant capacitor ($C_r$) 382b are between terminal G and the junction of switch S24 354, switch S23 353, and switch S26 356. The excitation inductor ($L_m$) 396b is between terminals G and H, across the first port 113b of the power converter stage 104b.

In one embodiment, the controller 106 operates the converters of FIGS. 3A, 3B and 3C in a symmetrical phase-shift gating control mode. In one embodiment, the controller 106 operates the converters of FIGS. 3A, 3B and 3C in a double phase-shift control mode.

In one embodiment, the controller 106 operates the LLC resonant converters of FIGS. 3B, 3D and 3F in a symmetrical gate driving mode. A symmetrical gate driving mode can help ensure DC bus voltage balancing. In one embodiment, the controller 106 operates the LLC resonant converters of FIGS. 3B, 3D and 3F in a symmetrical frequency modulation gating control mode.

In one embodiment, the controller 106 operates the power converter stages of any of FIGS. 3A to 3F in a pulse skipping mode. The pulse skipping mode may also be referred to as alternative gate control mode. Pulse skipping mode may improve efficiency at light loads. In one embodiment, the controller 106 operates the power converter stages of any of FIGS. 3A to 3F in a pulse skipping mode in response to light load conditions.

Figure 4A:
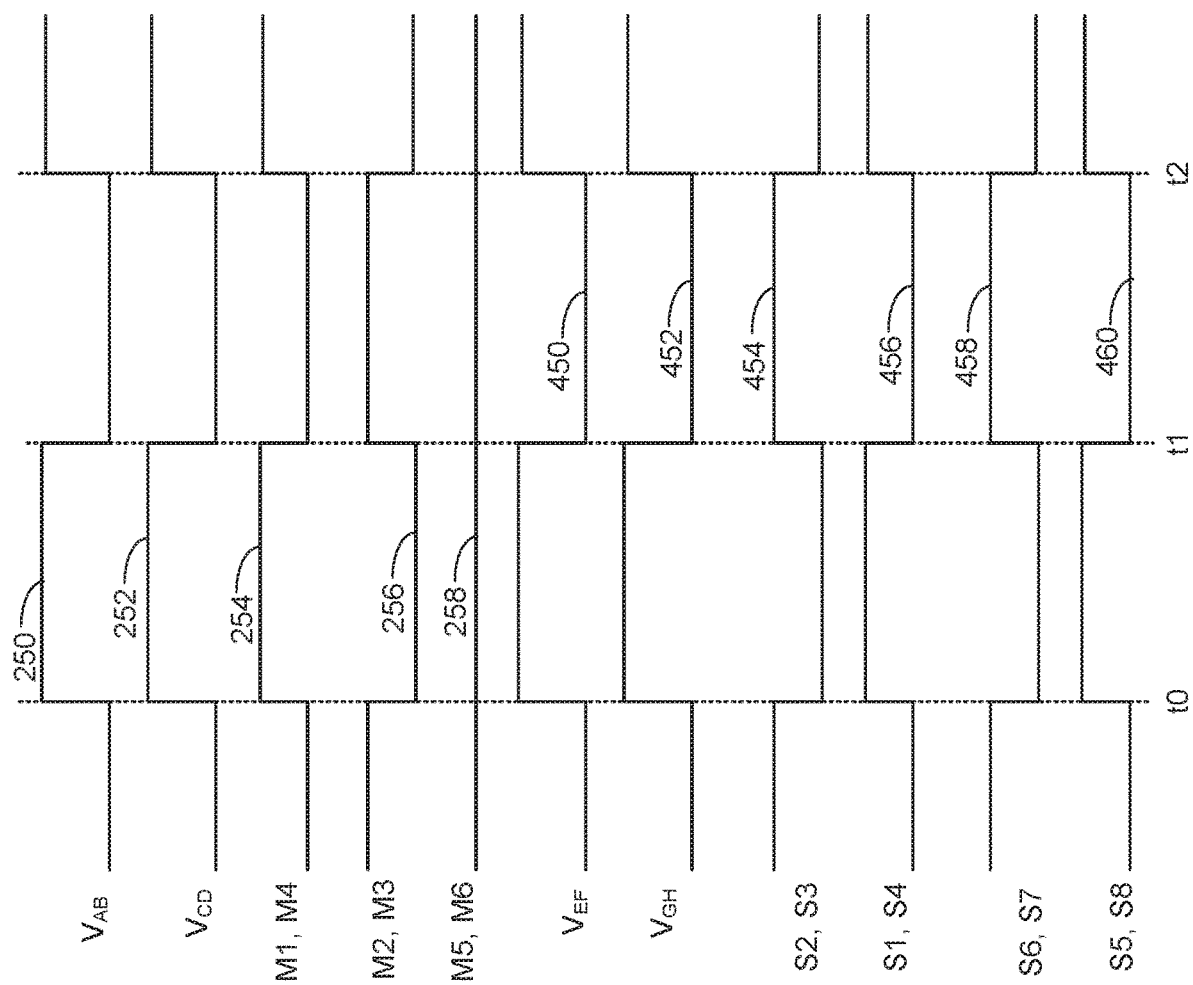
FIG. 4A depicts voltage waveforms during operation of one embodiment of a series configuration of a power converter.

FIG. 4A depicts voltage waveforms during operation of one embodiment of a series configuration of one embodiment of a power converter 100. The voltage waveforms labeled M1-M6 represents voltages that one embodiment of the controller 106 applies to control terminals (e.g., gates) of switches M1-M6 (201-206). The voltages are applied to the interleaved multi-bridge circuit 102 of FIG. 2A, in one embodiment. The waveforms applied to the gates of switches M1-M6 (201-206) are similar to those already discussed in connection with FIG. 2B, and hence will not be described in detail again.

The voltage $V_{AB}$ 250 represents the voltage across the second side 109b of transformer T1 in FIG. 1. The voltage $V_{CD}$ 252 represents the voltage across the second side 109b of transformer T2 in FIG. 1. These waveforms are similar to those already discussed in connection with FIG. 2B, and hence will not be described in detail again.

The voltage $V_{EF}$ 450 represents the voltage across the first side 109a transformer T1 in FIG. 1. The voltage $V_{GH}$ 452 represents the voltage across the first side 109a transformer T2 in FIG. 1. In the series configuration, the voltages across the first side 109a of first side 109a transformers T1 and T2 are in phase with each other. In other words, the voltages that are output by the two power converter stages 104a, 104b are in phase. Thus, waveforms $V_{EF}$ and $V_{GH}$ are in phase with each other.

FIG. 4A also depicts control voltages applied to switches S1-S8. In one embodiment, the controller 106 applies these voltages to a control terminal (e.g., gate) of switches S1-S8 (301-308) in FIG. 3A. The waveforms in FIG. 4A may also be used for the LLC resonant converters in FIG. 3B. Thus, similar voltages may also be applied to the control terminal of the switches S9-S16 (329-336) in FIG. 3B. For this substitution, switch S9 329 corresponds to switch S1 301; switch S10 330 corresponds to switch S2 302; switch S11 331 corresponds to switch S3 303; switch S12 332 corresponds to switch S4 304; switch S13 333 corresponds to switch S5 305; switch S14 334 corresponds to switch S6 306; switch S15 335 corresponds to switch S7 307; and switch S16 336 corresponds to switch S8 308.

Between time t0 and t1, the S1/S4 control voltage 456 applied to the control terminal (e.g., gate) of switches S1 301 and S4 304 is high, which turns those switches on. Between time t0 and t1, the S2/S3 control voltage 454 voltage applied to the control terminal (e.g., gate) of switches S2 302 and S3 303 is low, which turns those switches off. In the series configuration, the switches in power converter stages 104a and 104b are operating in an analogous manner. In other words, switch S5 is operated like switch S1, switch S6 is operated like switch S2, switch S7 is operated like switch S3, and switch S8 is operated like switch S4. Thus, between time t0 and t1, the S5/S8 control voltage 460 applied to the control terminal (e.g., gate) of switches S5 305 and S8 308 is high, which turns those switches on. Between time t0 and t1, the S6/S7 control voltage 458 applied to the control terminal (e.g., gate) of switches S6 306 and S8 308 is low, which turns those switches off.

Between time t1 and t2, the S1/S4 control voltage 456 applied to the control terminal (e.g., gate) of switches S1 301 and S4 304 is low, which turns those switches off. Between time t1 and t2, the S2/S3 control voltage 454 applied to the control terminal (e.g., gate) of switches S2 302 and S3 303 is high, which turns those switches on. Between time t1 and t2, the S5/S8 control voltage 460 applied to the control terminal (e.g., gate) of switches S5 305 and S8 308 is low, which turns those switches off. Between time t1 and t2, the S6/S7 control voltage 458 applied to the control terminal (e.g., gate) of switches S6 306 and S7 307 is high, which turns those switches on.

Figure 4B:
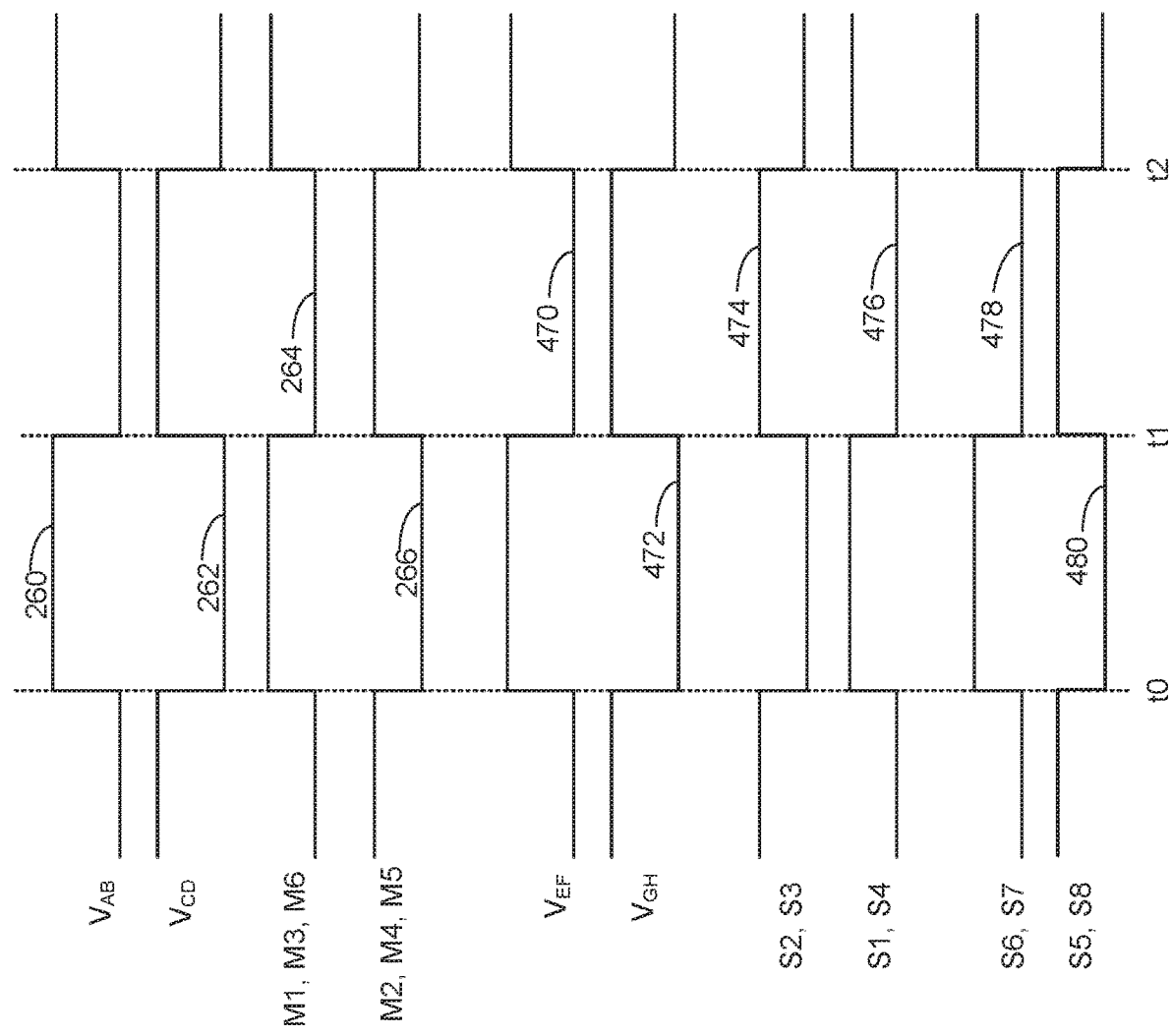
FIG. 4B depicts voltage waveforms during operation of one embodiment of a parallel configuration of a power converter.

FIG. 4B depicts voltage waveforms during operation of one embodiment of a parallel configuration of the power converter 100. The voltage waveforms labeled M1-M6 represents voltages that one embodiment of the controller 106 applies to gates of switches M1-M6 (201-206). The voltages are applied to the interleaved multi-bridge circuit 102 of FIG. 2A, in one embodiment. The waveforms applied to the gates of switches M1-M6 (201-206) are similar to those already discussed in connection with FIG. 2D, and hence will not be described in detail again.

The voltage $V_{AB}$ 260 represents the voltage across the second side 109b of transformer T1 in FIG. 1. The voltage $V_{CD}$ 262 represents the voltage across the second side 109b of transformer T2 in FIG. 1. These waveforms are similar to those already discussed in connection with FIG. 2D, and hence will not be described in detail again.

The voltage $V_{EF}$ 470 represents the voltage across the first side 109a transformer T1 in FIG. 1. The voltage $V_{GH}$ 472 represents the voltage across the first side 109a transformer T2 in FIG. 1. Note that in the parallel configuration, the voltages across the first side 109a of first side 109a transformers T1 and T2 are 180 degrees out of phase with each other in one embodiment. In other words, the voltages that are output by the two power converter stages 104a, 104b are 180 degrees out of phase with each other. Thus, voltages $V_{EF}$ 470 and $V_{GH}$ 472 are 180 degrees out of phase with each other.

FIG. 4B also depicts control voltages applied to switches S1-S8. In one embodiment, the controller 106 applies these voltages to a control terminal (e.g., gate) of switches S1-S8 (301-308) in FIG. 3A. However, note that similar voltages may also be applied to the control terminal of the switches S9-S16 (329-336) in FIG. 3B. For this substitution, switch S9 329 corresponds to switch S1 301; switch S10 330 corresponds to switch S2 302; switch S11 331 corresponds to switch S3 303; switch S12 332 corresponds to switch S4 304; switch S13 333 corresponds to switch S5 305; switch S14 334 corresponds to switch S6 306; switch S15 335 corresponds to switch S7 307; and switch S16 336 corresponds to switch S8 308.

Between time t0 and t1, the S1/S4 control voltage 476 applied to the control terminal (e.g., gate) of switches S1 301 and S4 304 is high, which turns those switches on. Between time t0 and t1, the S2/S3 control voltage 474 applied to the control terminal (e.g., gate) of switches S2 302 and S3 303 is low, which turns those switches off. In the parallel configuration, the switches in power converter stages 104a and 104b do not operate in an analogous manner. Between time t0 and t1, the S5/S8 control voltage 480 applied to the control terminal (e.g., gate) of switches S5 305 and S8 308 is low, which turns those switches off. Between time t0 and t1, the S6/S7 control voltage 478 applied to the control terminal (e.g., gate) of switches S6 306 and S7 307 is high, which turns those switches on.

Between time t1 and t2, the S1/S4 control voltage 476 applied to the control terminal (e.g., gate) of switches S1 301 and S4 304 are low, which turns those switches off. Between time t1 and t2, the S2/S3 control voltage 474 applied to the control terminal (e.g., gate) of switches S2 302 and S3 303 are high, which turns those switches on. Between time t1 and t2, the S5/S8 control voltage 480 applied to the control terminal (e.g., gate) of switches S5 305 and S8 308 are high, which turns those switches on. Between time t1 and t2, the S6/S7 control voltage 478 applied to the control terminal (e.g., gate) of switches S6 306 and S7 307 are low, which turns those switches off.

In some embodiments, the controller 106 changes the frequency of one or more of the control signals depicted in FIGS. 4A and 4B, depending on operating conditions. For example, under low DC current output (of the power converter 100), the frequency of the control signals (S1-S8) applied to control terminals of power converter stages 104a, 104b may be increased. In one embodiment, the controller 106 increases the frequency of the control signals (S1-S8) applied to control terminals of LLC resonant converters, such as those in FIGS. 3B, 3D and 3F, in response to low DC current output. As another example, under low DC voltage output (of the power converter 100), the frequency of the control signals (S1-S8) applied to control terminals of power converter stages 104a, 104b may be increased. In one embodiment, the controller 106 increases the frequency of the control signals (S1-S8) applied to control terminals of LLC resonant converters, such as those in FIGS. 3B, 3D and 3F, in response to low DC voltage output.

In some embodiments, the controller 106 uses pulse width modulation for at least some of the waveforms in FIGS. 4A and 4B. In some embodiments, pulse width modulation is used for the voltages to control terminals (e.g., gates) of switches S1-S8 (301-308) in FIGS. 3A, 3C and 3E. For example, pulse width modulation may be used when the DAB circuits in FIGS. 3A, 3C and 3E are used in an AC to DC power converter. In such an embodiment, the pulse width modulation may be used to assist in power factor correction. In one embodiment, pulse width modulation is not used when the DAB circuits in FIGS. 3A, 3C and 3E are used in a DC to DC power converter. Pulse width modulation can also be used to control other power converter stages 104a, 104b described herein.

Note that FIGS. 4A and 4B depict one embodiment of signals applied to the control terminals of the switches in the power converter stages 104a, 104b. However, the series configuration is not limited to the signals depicted in FIG. 4A that are applied to control terminals of the switches (S1-S8) in the power converter stages 104a, 104b. Also, the parallel configuration is not limited to the signals depicted in FIG. 4B that are applied to control terminals of the switches (S1-S8) in the power converter stages 104a, 104b.

The waveforms of FIGS. 4A and 4B may be modified for use with the circuit of FIG. 2B, as follows. A difference between the multi-bridge circuit 102 in FIG. 2B relative to the multi-bridge circuit 102 in FIG. 2A, is that the multi-bridge circuit 102 in FIG. 2B does not have active switches M5 205 and M6 206. The waveforms of FIG. 4A may be adapted for the multi-bridge circuit 102 in FIG. 2B by simply not using M5/M6 control voltage 258. The waveforms of FIG. 4B may be adapted for the multi-bridge circuit 102 in FIG. 2B by applying M1/M3/M6 control voltage 264 to the control terminals of M1 201 and M3 203; and applying M2/M4/M5 control voltage 266 to the control terminals of M2 202 and M4 204.

Figure 5:
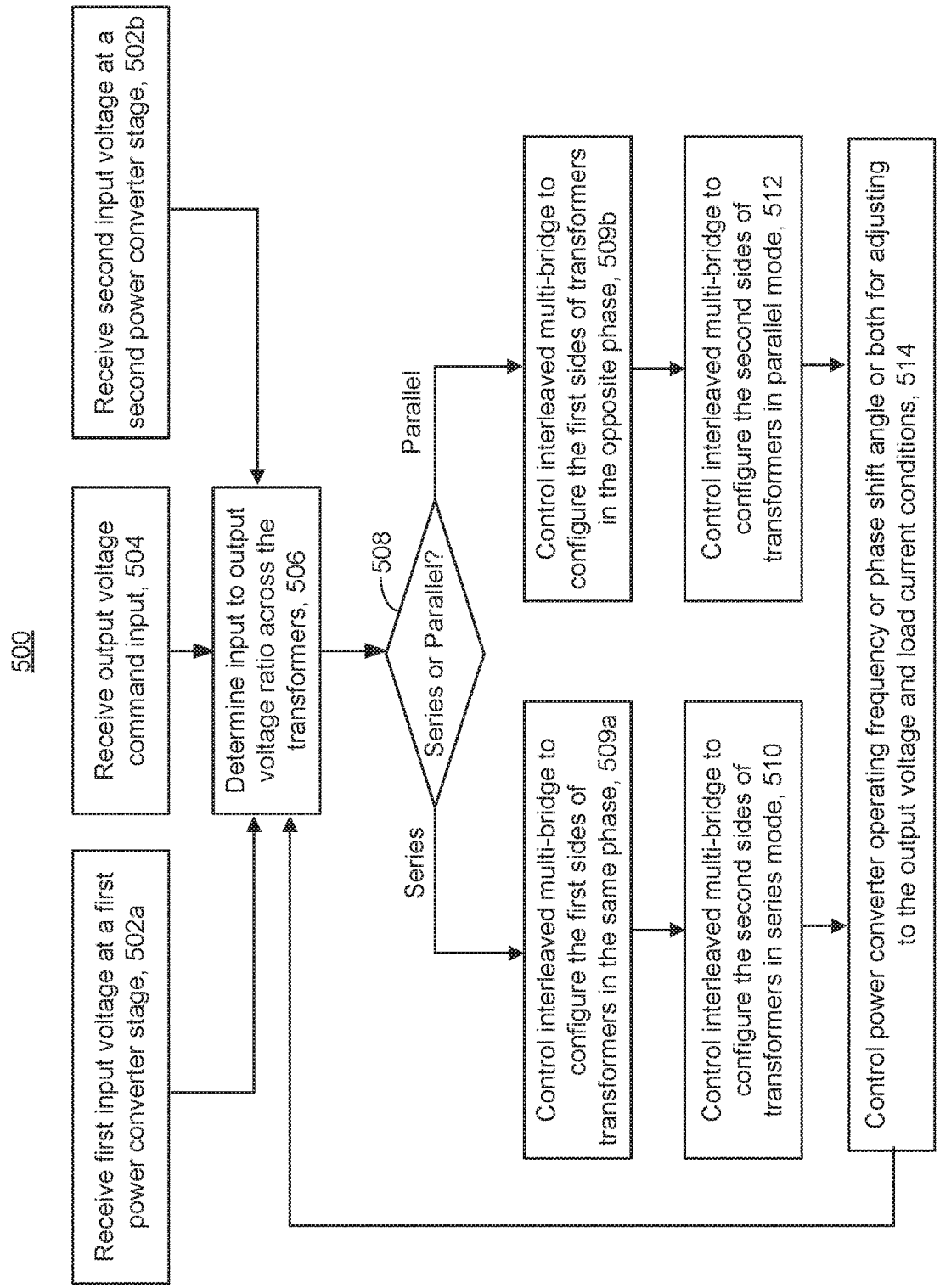
FIG. 5 is a flowchart of one embodiment of a process of operating a power converter in series/parallel configuration.

FIG. 5 is a flowchart of one embodiment of a process 500 of operating a power converter 100 in series/parallel configuration. The process 500 may be used to operate the power converter 100 of FIG. 1. The power converter 100 may include the interleaved multi-bridge circuit 102 of FIG. 2A or 2B, but is not limited to those embodiments. The power converter 100 may include any of the power converter stages 104a, 104b of FIGS. 3A-3F, but is not limited to those embodiments. Power may flow in either direction in process 500. For example, an energy source may be connected to either the second ports 111a, 111b or to the DC terminal 107. Process 500 is used to operate an AC to DC converter, in one embodiment. Process 500 is used to operate a DC to DC converter, in one embodiment. The steps of process 500 are described in a given order to facilitate explanation. However, those of ordinary skill will understand that the steps are not necessarily performed in the depicted order.

Step 502a includes receiving a first input voltage at a first power converter stage 104a. With respect to FIG. 1, V1a is received at the second port 111a of power converter stage 104a, in one embodiment. With respect to any of FIGS. 3A to 3F, V1a is received at the second port 111a of power converter stage 104a, in one embodiment. Step 502a may include controlling a first power converter stage (e.g., first high frequency converter). Step 502a may include applying control signal to control terminals in the first power converter stage to cause a transference of power between the first port 113a and the second port 111a. The power transference may be from the second port 111a to the first port 113a, or from the first port 113a to the second port 111a.

Step 502b includes receiving a first input voltage at a second power converter stage 104b. With respect to FIG. 1, V1b is received at the second port 111b of power converter stage 104b, in one embodiment. With respect to nay of FIGS. 3A to 3F, V1b is received at the second port 111b of power converter stage 104b, in one embodiment. Step 502b may include controlling a first power converter stage (e.g., first high frequency converter). Step 502b may include applying control signal to control terminals in the first power converter stage to cause a transference of power between the first port 113b and the second port 111b. The power transference may be from the second port 111b to the first port 113b, or from the first port 113b to the second port 111b.

Step 504 includes receiving an output voltage command input. Step 506 includes determining an input to output voltage address the transformers.

Step 508 includes a determination of whether to operate the power converter 100 in a series configuration or a parallel configuration. In one embodiment, this determination is made based at least in part on the magnitude of the DC voltage that is needed at DC terminal 107. For example, the DC voltage might need to be somewhere between 200 V and 800 V, depending on the requirements to charge a battery in an electrical vehicle. In one embodiment, a series configuration provides twice the voltage as a parallel configuration. In one embodiment, a parallel configuration provides twice the current as a series configuration.

Steps 509a and 510 may be performed in response to determining that the power converter 100 is to be operated in a series configuration. Step 509a includes controlling an interleaved multi-bridge circuit 102 (which is on the second side 109b of the transformers) to configure the first side 109a of the transformers in the same phase. An example of configuring the first side 109a of the transformers in the same phase is depicted in FIG. 4A, in which voltages $V_{EF}$ 450 and $V_{GH}$ 452 are in the same phase. The configuring the first side 109a of the transformers in the same phase includes configuring a voltage on the first side 109a of the transformers in the same phase, in one embodiment. In one embodiment of step 509a, the voltage waveforms in FIG. 4A are applied to control gates of switches in the power converter stages 104a, 104b, and in the interleaved multi-bridge circuit 102 in step 509a. Thus, step 509a may also include controlling the power converter stages 104a, 104b.

Step 510 may be performed in response to determining that the power converter 100 is to be operated in a series configuration. Step 510 includes controlling an interleaved multi-bridge circuit 102 (which is on the second side 109b of the transformers) to configure the second side 109b of the transformers in series at the DC terminal 107. In one embodiment, controller 106 applies control signals depicted in FIG. 2C to control terminals of switches M1-M6 (201-206). In one embodiment of step 510, the voltage waveforms in FIG. 4A are applied to control gates of switches in the power converter stages 104a, 104b, and in the interleaved multi-bridge circuit 102. Thus, step 510 may also include controlling the power converter stages 104a, 104b.

Steps 509b and 512 may be performed in response to determining that the power converter 100 is to be operated in a parallel configuration. Step 509b includes controlling an interleaved multi-bridge circuit 102 (which is on the second side 109b of the transformers) to configure the first side 109a of the transformers in the opposite phase. An example of configuring the first side 109a of the transformers in the opposite phase is depicted in FIG. 4B, in which voltages $V_{EF}$ 470 and $V_{GH}$ 472 are in the opposite phase. Thus, configuring the first side 109a of the transformers in the opposite phase includes configuring a voltage on the first side 109a of the transformers in the opposite phase, in one embodiment. In one embodiment of step 509b, the voltage waveforms in FIG. 4B are applied to control gates of switches in the power converter stages 104a, 104b, and in the interleaved multi-bridge circuit 102 in step 509b. Thus, step 509b may also include controlling the power converter stages 104a, 104b.

Step 512 includes controlling an interleaved multi-bridge circuit 102 (which is on the second side 109b of the transformers) to configure the second side 109b of the transformers in parallel at the DC terminal 107. In one embodiment, controller 106 applies control signals depicted in FIG. 2D to control terminals of switches M1-M6 (201-206). In one embodiment of step 512, the voltage waveforms in FIG. 4B are applied to control gates of switches in the power converter stages 104a, 104b, and in the interleaved multi-bridge circuit 102. Thus, step 512 may also include controlling the power converter stages 104a, 104b.

After step 510 or step 512, the process may perform step 514. Step 514 includes controlling the power converter operating frequency or phase shift angle or both for adjusting to the output voltage and load conditions. In one embodiment, the first power converter stage is a first dual active bridge (DAB) and the second power converter stage is a second dual active bridge (DAB), and step 514 includes the controller operating the first and second DAB converters in a symmetrical phase-shift gating control mode or a double phase-shift control mode.

In one embodiment, the first power converter stage is a first resonant converter and the second power converter stage is a second resonant converter, and step 514 includes the controller operating the first and second resonant converters in a symmetrical frequency modulation gating control mode.

In one embodiment, step 514 includes the controller operating the first and second power converter stages in a pulse skipping mode. After step 514, the process may return to step 506 to determine an input to output ratio across the transformers.

Figure 6:
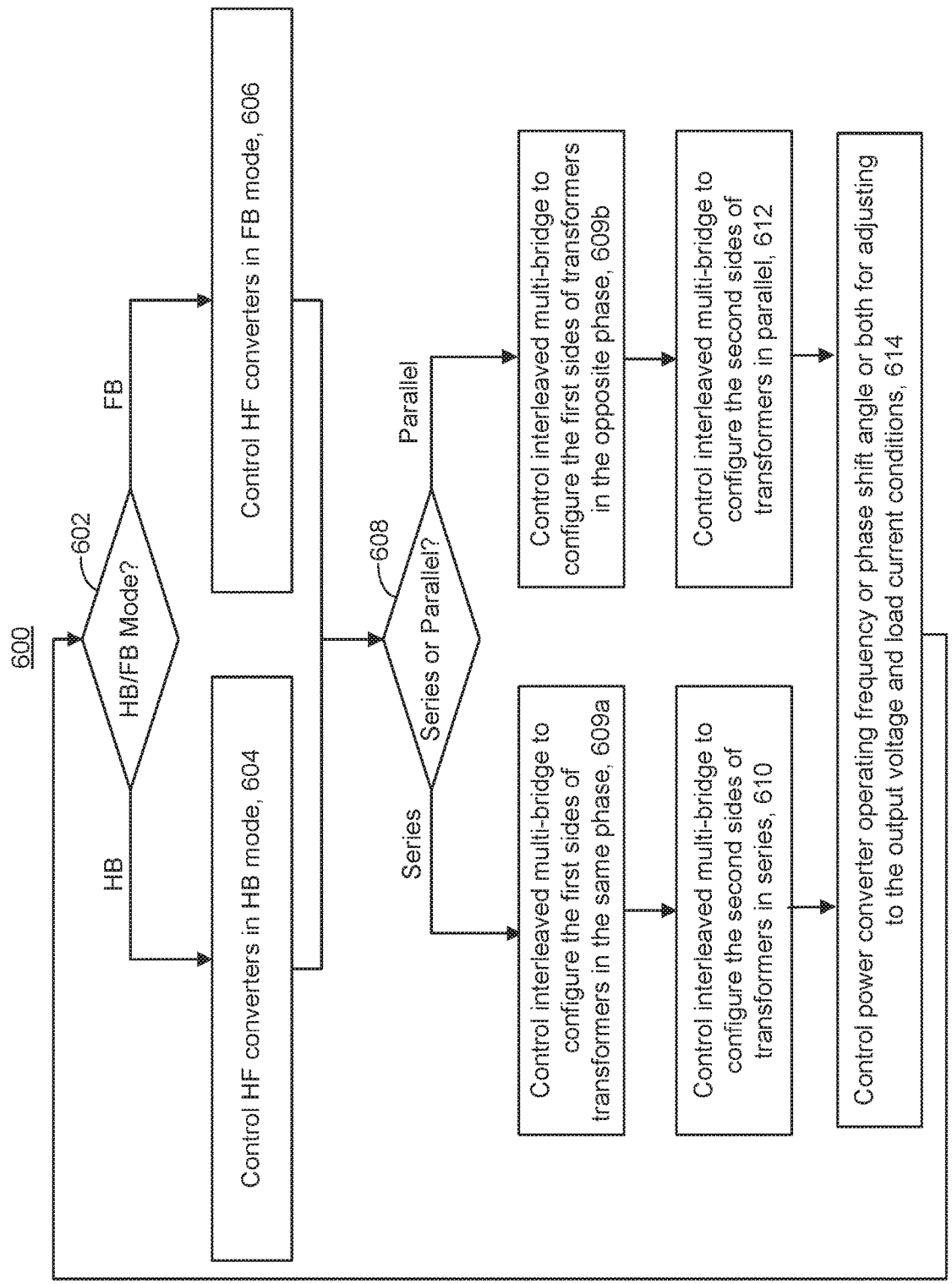
FIG. 6 is a flowchart of one embodiment of a process of operating a power converter in series/parallel configuration with either half-bridge or full-bridge mode.

FIG. 6 is a flowchart of one embodiment of a process 600 of operating a power converter 100 in series/parallel configuration with either half-bridge or full-bridge mode. The process 600 may be used to operate the power converter 100 of FIG. 1. The power converter 100 may include the interleaved multi-bridge circuit 102 of FIG. 2A or 2B, but is not limited to those embodiments. The power converter 100 may include any of the power converter stages 104a, 104b of FIGS. 3A-3F, but is not limited to those embodiments. Process 600 is used to operate an AC to DC converter, in one embodiment. Process 600 is used to operate a DC to DC converter, in one embodiment. The steps of process 600 are described in a given order to facilitate explanation. Power may flow in either direction in process 600. For example, an energy source may be connected to either the second ports 111a, 111b or to the DC terminal 107.

Step 602 includes a determination of whether to operate the power converter 100 in a half-bridge (HB) mode or a full-bridge (FB) mode. In one embodiment, this determination is made based at least in part on the magnitude of the DC output voltage that is needed. For example, the DC output voltage might need to be somewhere between 200 V and 800 V, depending on the requirements to charge a battery in an electrical vehicle. In one embodiment, a full-bridge configuration provides twice the voltage as a half-bridge configuration. Depending on the outcome of step 602, either step 604 or 606 is performed.

In response to determining that the power converter 100 is to be operated in the half-bridge mode, step 604 is performed. In step 604, the power converter stages 104a, 104b are operated in a half-bridge mode. In the half-bridge mode, the voltage at the first ports 113a, 113b is half the voltage at the respective second ports 111a, 111b, in one embodiment. In the half-bridge mode, each power converter stage 104a, 104b provides one half of its input voltage (V1a or V1b) to the first side 109a of its respective transformer, in one embodiment.

In one embodiment, the half-bridge mode is achieved by alternating between a first phase and a second phase. The following refers to one embodiment of operating switches in the DAB converter of FIGS. 3A, 3C and 3E. In the first phase, the following switches are on: switch S1 301, switch S3 303, switch S5 305, and switch S7 307. In the first phase the following switches are off: switch S2 302, switch S4 304, switch S6 306, and switch S8 308. In the second phase, the switching reverses such that: the following switches are off: switch S1 301, switch S3 303, switch S5 305, and switch S7 307. In the second phase the following switches are on: switch S2 302, switch S4 304, switch S6 306, and switch S8 308.

The following refers to one embodiment of operating switches in the LLC converter of FIGS. 3B, 3D, and 3F. In the first phase, the following switches are on: switch S9 329, switch S11 331, switch S13 333, and switch S15 335. In the first phase the following switches are off: switch S10 330, switch S12 332, switch S14 334, and switch S16 336. In the second phase, the switching reverses such that: the following switches are off: switch S9 329, switch S11 331, switch S13 333, and switch S15 335. In the second phase the following switches are on: switch S10 330, switch S12 332, switch S14 334.

Step 604 includes the controller 106 providing control signals to the control terminals of switches S1-S8 (301-308), in one embodiment. Step 604 includes the controller 106 providing control signals to the control terminals of switches S9-S16 (329-336), in one embodiment.

In response to determining that the power converter 100 is to be operated in the full-bridge mode, step 606 is performed. In step 606, the power converter stages 104a, 104b are operated in a full-bridge mode. In the full-bridge mode, the voltage at the first ports 113a, 113b is equal to the voltage at the respective second ports 111a, 111b, in one embodiment. In one embodiment of the full-bridge mode, each power converter stage 104a, 104b provides the full input voltage (V1a or V1b) to the first side 109a of its respective transformer.

In one embodiment, the full-bridge mode is achieved by alternating between a first phase and a second phase. The following refers to one embodiment of operating switches in the DAB converter of FIGS. 3A, 3C and 3E. In the first phase, the following switches are on: switch S1 301, switch S4 304, switch S5 305, and switch S8 308. In the first phase the following switches are off: switch S2 302, switch S3 303, switch S6 306, and switch S7 307. In the second phase, the switching reverses such that: the following switches are off: switch S1 301, switch S4 304, switch S5 305, and switch S8 308. In the second phase the following switches are on: switch S2 302, switch S3 303, switch S6 306, and switch S7 307.

The following refers to one embodiment of operating switches in the LLC converter of FIGS. 3B, 3D, and 3F. In the first phase, the following switches are on: switch S9 329, switch S12 332, switch S13 333, and switch S16 336. In the first phase the following switches are off: switch S10 330, switch S11 331, switch S14 334, and switch S15 335. In the second phase, the switching reverses such that: the following switches are off: switch S9 329, switch S12 332, switch S13 333, and switch S16 336. In the second phase the following switches are on: S10 330, switch S11 331, switch S14 334, and switch S15 335.

Step 606 includes the controller 106 providing control signals to the control terminals of switches S1-S8 (301-308), in one embodiment. Step 604 includes the controller 106 providing control signals to the control terminals of switches S9-S16 (329-336), in one embodiment.

Step 608 includes a determination of whether to operate the power converter 100 in a series configuration or a parallel configuration. Note that this step may be similar to step 506. However, step 608 is performed in combination with step 608. Thus, various combinations of series/parallel configuration with HB/FB mode are possible. Depending on the outcome of step 608, either steps 609a and 610 or steps 609b and 612 are performed.

Steps 609a and 610 may be performed in response to determining that the power converter 100 is to be operated in a series configuration. Step 609a includes controlling an interleaved multi-bridge circuit 102 (which is on the second side 109b of the transformers) to configure the first side 109a of the transformers in the same phase. An example of configuring the first side 109a of the transformers in the same phase is depicted in FIG. 4A, in which voltages $V_{EF}$ 450 and $V_{GH}$ 452 are in the same phase. Thus, configuring the first side 109a of the transformers in the same phase includes configuring a voltage on the first side 109a of the transformers in the same phase, in one embodiment. In one embodiment of step 609a, the voltage waveforms in FIG. 4A are applied to control gates of switches in the power converter stages 104a, 104b, and in the interleaved multi-bridge circuit 102 in step 609a. Thus, step 609a may also include controlling the power converter stages 104a, 104b.

Step 610 may be performed in response to determining that the power converter 100 is to be operated in a series configuration. Step 610 includes controlling an interleaved multi-bridge circuit 102 (which is on the second side 109b of the transformers) to configure the second side 109b of the transformers in series at the DC terminal 107. In one embodiment, controller 106 applies control signals depicted in FIG. 2C to control terminals of switches M1-M6 (201-206). In one embodiment of step 610, the voltage waveforms in FIG. 4A are applied to control gates of switches in the power converter stages 104a, 104b, and in the interleaved multi-bridge circuit 102. Thus, step 610 may also include controlling the power converter stages 104a, 104b.

Steps 609b and 612 may be performed in response to determining that the power converter 100 is to be operated in a parallel configuration. Step 609b includes controlling an interleaved multi-bridge circuit 102 (which is on the second side 109b of the transformers) to configure the first side 109a of the transformers in the opposite phase. An example of configuring the first side 109a of the transformers in the opposite phase is depicted in FIG. 4B, in which voltages $V_{EF}$ 470 and $V_{GH}$ 472 are in the opposite phase. Thus, configuring the first side 109a of the transformers in the opposite phase includes configuring a voltage on the first side 109a of the transformers in the opposite phase, in one embodiment. In one embodiment of step 609b, the voltage waveforms in FIG. 4B are applied to control gates of switches in the power converter stages 104a, 104b, and in the interleaved multi-bridge circuit 102 in step 609b. Thus, step 609b may also include controlling the power converter stages 104a, 104b.

Step 612 includes controlling an interleaved multi-bridge circuit 102 (which is on the second side 109b of the transformers) to configure the second side 109b of the transformers in parallel at the DC terminal 107. In one embodiment, controller 106 applies control signals depicted in FIG. 2D to control terminals of switches M1-M6 (201-206). In one embodiment of step 612, the voltage waveforms in FIG. 4B are applied to control gates of switches in the power converter stages 104a, 104b, and in the interleaved multi-bridge circuit 102. Thus, step 612 may also include controlling the power converter stages 104a, 104b.

After step 610 or step 612, the process may perform step 614. Step 614 includes controlling the power converter operating frequency or phase shift angle or both for adjusting to the output voltage and load conditions. In one embodiment, the first power converter stage is a first dual active bridge (DAB) and the second power converter stage is a second dual active bridge (DAB), and step 614 includes the controller operating the first and second DAB converters in a symmetrical phase-shift gating control mode or a double phase-shift control mode. In one embodiment, the first power converter stage is a first resonant converter and the second power converter stage is a second resonant converter, and step 614 includes the controller operating the first and second resonant converters in a symmetrical frequency modulation gating control mode. In one embodiment, step 614 includes the controller operating the first and second power converter stages in a pulse skipping mode.

After step 614, the process may return to step 602 to determine whether to operate the power converter 100 in full-bridge mode or half-bridge mode. For example, if it is desired to reduce the DC output voltage of the power converter 100, operation could switch from full-bridge mode to half-bridge mode.

In some embodiments, any combination of HB/FB mode and series/parallel confirmation are possible in process 600. Thus, the HB mode may be used with a parallel configuration for a relatively low DC voltage at DC terminal (e.g., 200 V). The HB mode may be used with a series configuration for a medium DC voltage at DC terminal (e.g., 400 V). The FB mode may be used with a parallel configuration for a medium DC voltage at DC terminal (e.g., 400 V). The FB mode may be used with a series configuration for a high DC voltage at DC terminal (e.g., 800 V).

A variety of input stages are possible for embodiments of power converters 100 described herein. Some embodiments of a power converter 100 are an AC to DC power converter. Such AC to DC power converters may have one or more AC to DC rectifiers, which may be used as an input stage(s). The AC to DC rectifiers are used for power factor correction (PFC), in some embodiments.

FIG. 7A shows one embodiment of a power converter 100 having two AC to DC rectifiers 704a, 704b, which may be used as input stages. AC to DC rectifier 704a has an input that is able to receive an AC power source 702a. The AC to DC rectifier 704a has an output that is connected to the second port 111a of power converter stage 104a. The power converter stage 104a may be any of the power converter stages 104a disclosed herein. AC to DC rectifier 704b has an input that is able to receive an AC power source 702b. The AC to DC rectifier 704b has an output that is connected to the second port 111b of power converter stage 104b. The power converter stage 104b may be any of the power converter stages 104b disclosed herein. Any of the interleaved multi-bridge circuits 102 described herein may be used in the power converter 100 FIG. 7A.

The output of each of the AC to DC rectifiers 704a, 704b is referred to herein as a DC bus. In the embodiment of FIG. 7A, each power converter stage 104a, 104b is connected to a separate DC bus.

FIG. 7б shows one embodiment of a power converter 100 having a single AC to DC rectifier 704 (connected to AC source 702) that is shared by the two power converter stages 104a, 104b. Thus, the respective inputs of the two power converter stages 104a, 104b are connected to the same DC bus. As with the embodiment of FIG. 7A, any of the power converter stages 104a, 104b described herein may be used in the power converter 100 FIG. 7B. As with the embodiment of FIG. 7A, any of the interleaved multi-bridge circuits 102 described herein may be used in the power converter 100 FIG. 7B.

Figure 8A:
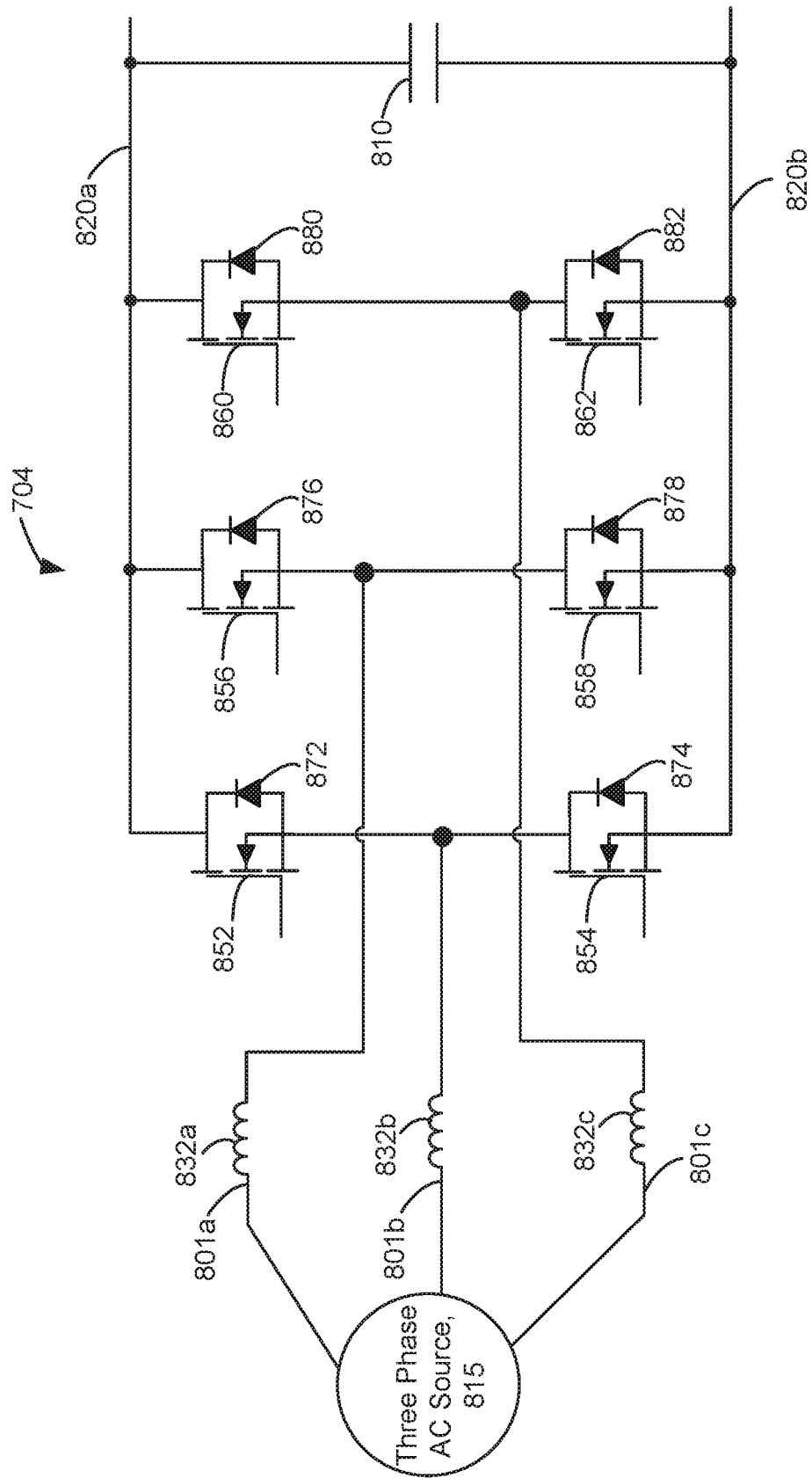
FIGS. 8A and 8B depict various embodiments of AC to DC rectifiers that may be used in embodiments of power converters.
Figure 8B:
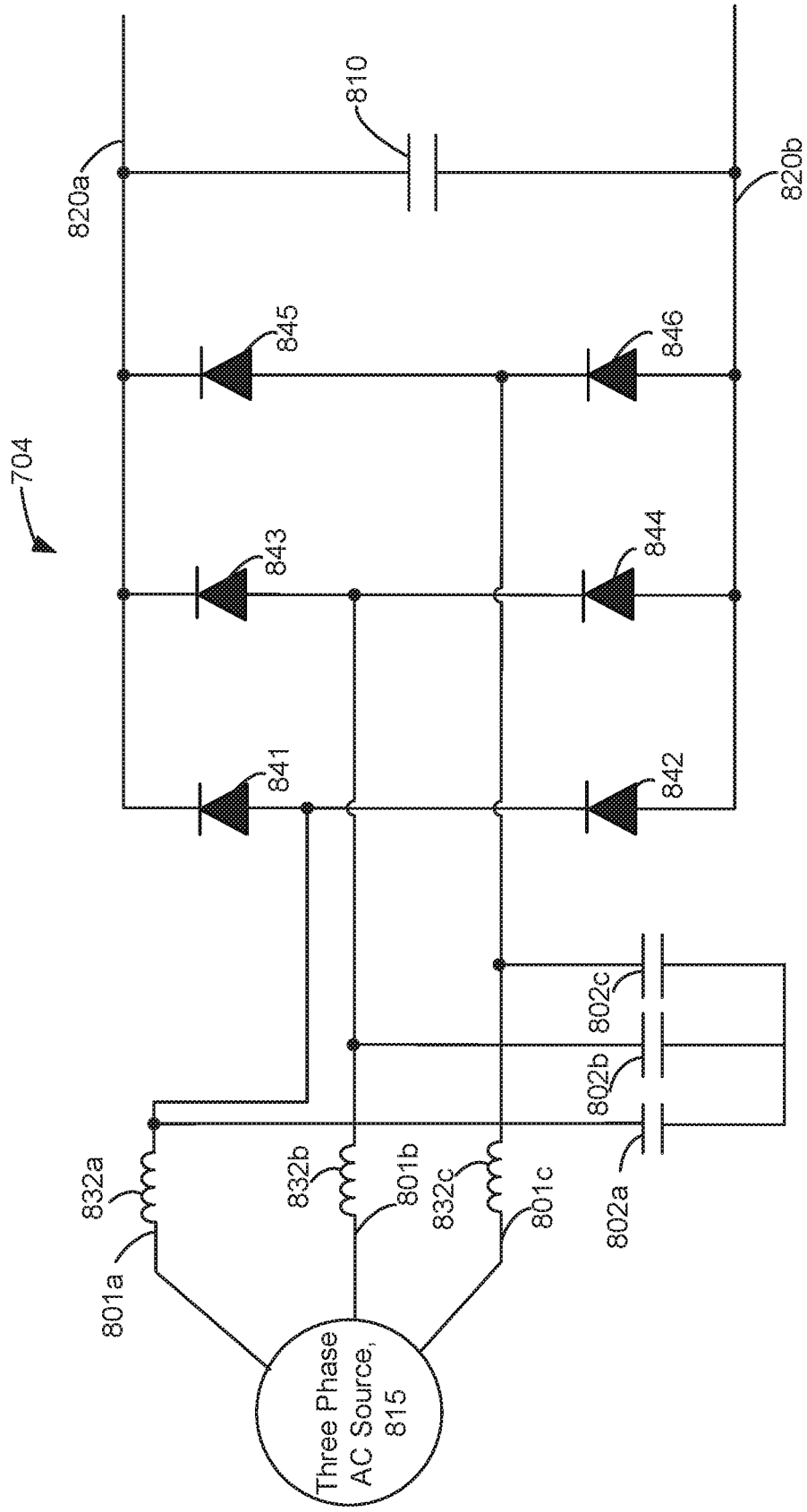

The efficient nature of embodiments of power converters 100 disclosed herein allows the AC to DC rectifier(s) 704 to be relatively simple circuits. FIGS. 8A-8B show various embodiments of AC to DC rectifier(s) 704 that may be used in embodiments of power converters 100. These AC to DC rectifier(s) 704 can save cost relative to, for example, a high frequency boost PFC (Power Factor Correction). The embodiments depicted in FIGS. 8A-8B may be used for the AC to DC rectifiers in FIG. 7A or 7B.

FIG. 8A is a diagram of one embodiment of an AC to DC rectifier 704. The AC to DC rectifier 704 could be used in the power converter 100 of FIG. 7A or 7B. The AC to DC rectifier 704 is a three-level rectifier, in this embodiment. The three-levels are associated with input electrical lines 801a, 801b, and 801c, respectively. A three phase AC source 815 is connected to the input electrical lines 801a, 801b, and 801c. Input inductor 832a is connected to input line electrical 801a. Input inductor 832b is connected to input electrical line 801b. Input inductor 832c is connected to input electrical line 801c.

Electrical lines 820a and 820b may serve as the DC bus. Output capacitor 810 is across the DC bus. Transistors 852 and 854 are connected in series across the DC bus. Transistors 856 and 858 are connected in series across the DC bus. Transistors 860 and 862 are connected in series across the DC bus. Transistor 852 is in parallel with diode 872. Transistor 854 is in parallel with diode 874. Transistor 856 is in parallel with diode 876. Transistor 858 is in parallel with diode 878. Transistor 860 is in parallel with diode 880. Transistor 862 is in parallel with diode 882.

It is not required for the AC to DC rectifier 704 to include active switches. In some embodiments, the AC to DC rectifier 704 has a passive bridge. FIG. 8B is a diagram of one embodiment of an AC to DC rectifier 704 having a passive bridge. Herein, this is referred to as a "passive AC to DC rectifier." The AC to DC rectifier 704 could be used in the power converter 100 of FIG. 7A or 7B. The AC to DC rectifier 704 is a three-level rectifier, in this embodiment. The three-levels are associated with input electrical lines 801a, 801b, and 801c, respectively. A three phase AC source 815 is connected to the input electrical lines 801a, 801b, and 801c. Input capacitor 802a is connected to input line electrical 801a. Input capacitor 802b is connected to input electrical line 801b. Input capacitor 802c is connected to input electrical line 801c. The three input capacitors 802a, 802b, and 802c have their other terminals in common.

Electrical lines 820a and 820b may serve as the DC bus. Output capacitor 810 is across the DC bus. Diodes 841 and 842 are connected in series across the DC bus. Diodes 843 and 844 are connected in series across the DC bus. Diodes 845 and 846 are connected in series across the DC bus. The anode of diode 841 is connected to input electrical line 801a. The cathode of diode 842 is connected to input electrical line 801a. The anode of diode 843 is connected to input electrical line 801b. The cathode of diode 844 is connected to input electrical line 801b. The anode of diode 845 is connected to input electrical line 801c. The cathode of diode 846 is connected to input electrical line 801c.

Figure 9:
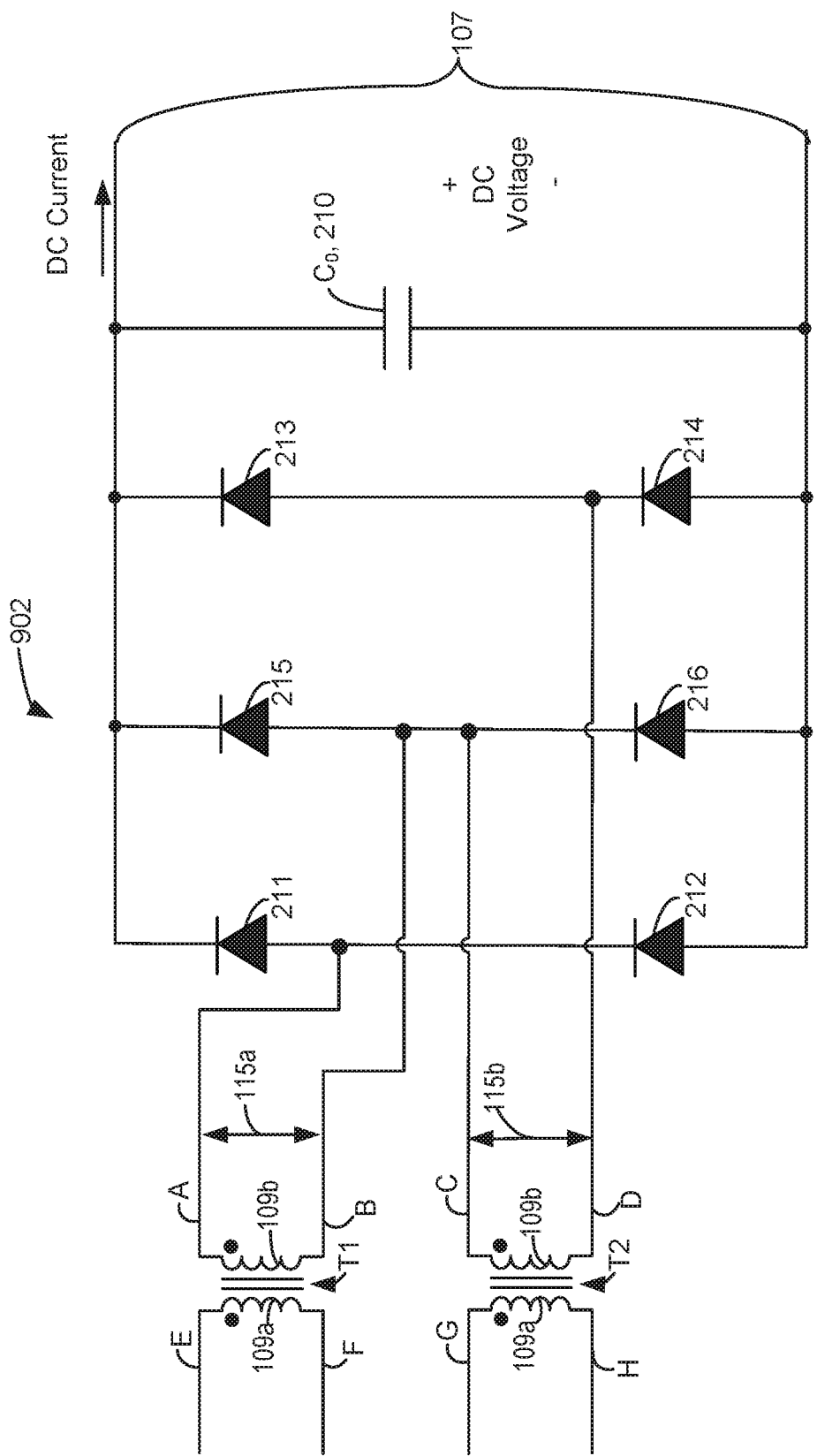
FIG. 9 is a diagram of one embodiment of a passive multi-bridge that may substitute for an interleaved multi-bridge circuit in embodiments of power converters disclosed herein.

In some embodiments, the interleaved multi-bridge circuit is replaced with passive multi-bridge. FIG. 9 is a diagram of one embodiment of a passive multi-bridge 902 that may substitute for an interleaved multi-bridge circuit 102 in embodiments of power converters 100. The passive multi-bridge 902 is similar to the interleaved multi-bridge circuit in FIG. 2A, except that the active switches M1-M6 (201-206) have been removed. In this embodiment, the passive multi-bridge 902 has diode 211 and 212, which together form a first bridge; diode 213 and 214, which together form a second bridge; and diode 215 and 216, which together form a third bridge.

The passive multi-bridge 902 is used in place of the interleaved multi-bridge circuit 102 in FIG. 1, in one embodiment. Note that the controller 106 need not provide any control signals to one embodiment of the passive multi-bridge 902. The passive multi-bridge 902 may be used in a power converter 100 with any of the power converter stages 104a, 104b described herein. The passive multi-bridge 902 may be used in a power converter 100 with any of the AC to DC rectifiers 704 described herein.

In particular, one embodiment is a power converter 100 that includes the power converter stages 104a, 104b depicted in FIGS. 3A and 3B with the passive multi-bridge 902 of FIG. 9. Any of the AC to DC rectifiers 704 described herein may be used with the combination of the power converter stages 104a, 104b depicted in FIGS. 3A and 3B and the passive multi-bridge 902 of FIG. 9. In one embodiment, when the passive multi-bridge 902 is used in combination with the power converter stages 104a, 104b depicted in FIGS. 3A and 3B this is referred to as a phase shift full bridge (PSFB) converter.

Figure 10:
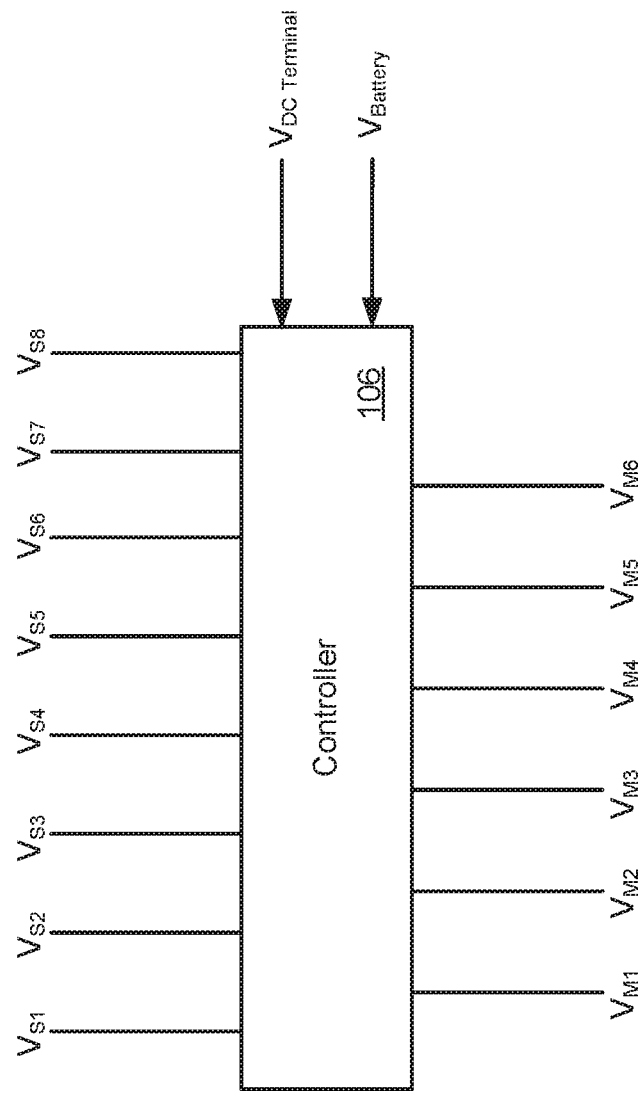
FIG. 10 depicts inputs and outputs to one embodiment of a controller in a power converter.

FIG. 10 depicts one embodiment of inputs and outputs to controller 106. In one embodiment, the controller 106 is implemented as one or more integrated circuit chips, each having a number of input/output pins. One or more pins may be used to monitor an input voltage. One possibility is to monitor the DC terminal 107 of the power converter 100. Another possibility is to monitor a signal that indicates a voltage level to provide at the DC output of the power converter 100. Such a signal might indicate a voltage level needed to charge a battery of an electric vehicle. FIG. 10 shows the signal "VBattery" to indicate such a signal. This signal can be provided in a variety of formats including, for example, an analog signal or a digital signal.

Several pins may be used to provide the control terminal voltages $V_{M1}$, $V_{M2}$, $V_{M3}$, $V_{M4}$, $V_{M5}$, and/or $V_{M6}$. Several pins may be used to provide the control terminal voltages $V_{S1}$, $V_{S2}$, $V_{S3}$, $V_{S4}$, $V_{S5}$, $V_{S6}$, $V_{S7}$, and/or $V_{S8}$. Internally, the chip(s) may contain an Application Specific Integrated Circuit (ASIC), which may be configured to generate control terminal voltages in response to the output DC bus voltage and/or an input signal that indicates the desired output DC bus voltage. The controller 106 may use other inputs to determine the proper waveform for control terminal voltages. The controller 106 may include a state machine or the like that controls the timing of the control terminal voltages. The controller 106 may generate the control terminal voltages as depicted and described with respect to FIGS. 2C, 2D, 4A, and/or 4B.

The embodiments present above consequently present a topology and operation/control strategy for a power converter. The power converter has a controller that operates an interleaved multi-bridge circuit in other a series configuration or a parallel configuration, in one embodiment. This provides for a wide range in DC voltage at a DC terminal of the power converter. The power converter has a controller that operates power converter stages in other a half bridge or full bridge mode (in combination with the series configuration or a parallel configuration), in one embodiment. Combining the half bridge or full bridge mode with the series configuration or a parallel configuration provides for an even wide range in DC output voltage.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of the invention be defined by the claims appended hereto.

What is claimed is:

1. An apparatus comprising:
   a first power converter stage configured to transfer power between its first port and second port;
   a second power converter stage configured to transfer power between its first port and second port;
   an interleaved multi-bridge circuit connected to a first transformer and a second transformer, wherein the interleaved multi-bridge circuit comprises three or more bridges and has a direct current (DC) terminal; and
   a controller coupled to the interleaved multi-bridge circuit, the first power converter stage, and the second power converter stage, wherein the controller is configured to operate the interleaved multi-bridge circuit in a parallel mode in which a side of the first and second transformers are in parallel at the DC terminal resulting in a first voltage at the DC terminal being equal to both a second voltage on the side of the first transformer and a third voltage on the side of the second transformer.

2. The apparatus of claim 1, wherein the controller is further configured to operate the first power converter stage and the second power converter stage in a full bridge mode.

3. The apparatus of claim 2, wherein the controller is further configured to operate the first power converter stage and the second power converter stage in a half bridge mode.

4. The apparatus of claim 1, wherein the first power converter stage is a first dual active bridge (DAB) and the second power converter stage is a second dual active bridge (DAB), wherein the controller is further configured to operate the first and second DABs in a symmetrical phase-shift gating control mode or a double phase-shift control mode.

5. The apparatus of claim 1, wherein the first power converter stage is a first resonant converter and the second power converter stage is a second resonant converter, wherein the controller is further configured to operate the first and second resonant converters in a symmetrical frequency modulation gating control mode.

6. The apparatus of claim 1, wherein the controller is further configured to operate the first and second power converter stages in a pulse skipping mode.

7. The apparatus of claim 1, further comprising:
   one or more AC to DC rectifiers connected to an input of the first power converter stage and to the input of the second power converter stage.

8. A method of operating a power converter, the method comprising:
   controlling a first high frequency converter to transfer power between a first port and a second port;
   controlling a second high frequency converter to transfer power between a first port and a second port; and
   controlling an interleaved multi-bridge circuit connected to a side of a first transformer and a side of a second transformer in a series mode in which the sides of the first and second transformers are in series at the DC terminal of the interleaved multi-bridge circuit resulting in a first voltage at the DC terminal being a summation of a second voltage on the second side of the first transformer and a third voltage on the second side of the second transformer, wherein the interleaved multi-bridge circuit comprises three or more bridges.

9. The method of claim 8, further comprising:
operating the first high frequency converter and the second high frequency converter in a full bridge mode while operating the interleaved multi-bridge circuit in the series mode or in a parallel mode.

10. The method of claim 9, further comprising:
operating the first high frequency converter and the second high frequency converter in a half bridge mode while operating the interleaved multi-bridge circuit in a parallel mode or in the series mode.

11. The method of claim 8, wherein the first high frequency converter is a first dual active bridge (DAB) and the second high frequency converter is a second dual active bridge (DAB), and further comprising:
operating the first and second DABs in either a double phase shift control mode or a symmetrical phase-shift gating control mode.

12. The method of claim 8, wherein the first high frequency converter is a first resonant converter and the second high frequency converter is a second resonant converter, further comprising operating the first and second resonant converters in a symmetrical frequency modulation driving mode.

13. The method of claim 8, further comprising operating the first and second high frequency converters in a pulse skipping mode in response to light load conditions.

14. An alternating current (AC) to direct current (DC) converter, comprising:
one or more AC to DC rectifiers each having an input and an output, wherein the one or more AC to DC rectifiers are each configured to provide a DC voltage to their respective output in response to an AC voltage at their respective input;
a first high frequency converter having an input connected to the output of one of the one or more AC to DC rectifiers, the first high frequency converter having an output connected to a first side of a first transformer, wherein the first high frequency converter is configured to provide a first output voltage to the first side of the first transformer in response to a first DC voltage from one of the one or more AC to DC rectifiers;
a second high frequency converter having an input connected to the output of one of the one or more AC to DC rectifiers, the second high frequency converter having an output connected to a first side of a second transformer, wherein the second high frequency converter is configured to provide a second output voltage to the first side of the second transformer in response to a second DC voltage from one of the one or more AC to DC rectifiers;
an interleaved multi-bridge circuit connected to a second side of the first transformer and to a second side of the second transformer, wherein the interleaved multi-bridge circuit comprises three or more bridges and has a direct current (DC) output; and
a controller coupled to the interleaved multi-bridge circuit, to the first high frequency converter, and to the second high frequency converter, wherein the controller is configured to operate the interleaved multi-bridge circuit in a parallel mode in which the second sides of the first and second transformers are in parallel at the DC output resulting in a first voltage at the DC output being equal to both a second voltage on the second side of the first transformer and a third voltage on the second side of the second transformer.

15. The AC to DC converter of claim 14, wherein the controller is further configured to operate the first high frequency converter and the second high frequency converter in a full bridge mode when controller operates the interleaved multi-bridge circuit in the series mode.

16. The AC to DC converter of claim 15, wherein the controller is further configured to operate the first high frequency converter and the second high frequency converter in a half bridge mode when controller operates the interleaved multi-bridge circuit in the parallel mode.

17. The AC to DC converter of claim 14, wherein the first high frequency converter is a first dual active bridge (DAB) and the second high frequency converter is a second dual active bridge (DAB), wherein the controller is further configured to operate the first and second DABs in a symmetrical phase-shift gating control mode or a double phase-shift control mode.

18. The AC to DC converter of claim 14, wherein the first high frequency converter is a first Inductor-Inductor-Capacitor (LLC) resonant converter and the second high frequency converter is a second LLC resonant converter, wherein the controller is further configured to operate the first and second LLC resonant converters in a symmetrical frequency modulation gating control mode.

19. The AC to DC converter of claim 14, wherein the controller is further configured to operate the first and second high frequency converters in a pulse skipping mode in response to light load conditions.

20. The AC to DC converter of claim 14, wherein the first high frequency converter and the second high frequency converter each input the same DC voltage from the same AC to DC rectifier.

* * * * *